United States Patent
Komori et al.

(10) Patent No.: US 7,748,909 B2
(45) Date of Patent: Jul. 6, 2010

(54) BEARING APPARATUS FOR A WHEEL OF VEHICLE

(75) Inventors: Kazuo Komori, Iwata (JP); Kazuhiro Baba, Iwata (JP); Kazunori Kubota, Iwata (JP); Takayuki Norimatsu, Iwata (JP); Akira Fujimura, Iwata (JP); Shinji Morita, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/257,412

(22) Filed: Oct. 24, 2008

(65) Prior Publication Data
US 2009/0052823 A1  Feb. 26, 2009

Related U.S. Application Data

(63) Continuation of application No. PCT/JP2007/000453, filed on Apr. 25, 2007.

(30) Foreign Application Priority Data

| Apr. 25, 2006 | (JP) | 2006-120449 |
| Apr. 25, 2006 | (JP) | 2006-120450 |
| Apr. 25, 2006 | (JP) | 2006-120451 |
| Apr. 25, 2006 | (JP) | 2006-120452 |
| May 8, 2006 | (JP) | 2006-129034 |
| May 9, 2006 | (JP) | 2006-129913 |

(51) Int. Cl.
*F16C 13/00* (2006.01)
*F16C 43/00* (2006.01)

(52) U.S. Cl. ................ 384/544; 384/625

(58) Field of Classification Search ........... 384/448, 384/450, 477, 489, 494, 544, 625, 913; 29/898.06
See application file for complete search history.

(56) References Cited

U.S. PATENT DOCUMENTS 4,248,487 A * 2/1981 Asberg ............... 384/494
6,036,371 A * 3/2000 Onose ............... 384/494

(Continued)

FOREIGN PATENT DOCUMENTS

JP    11-091308    4/1999

(Continued)

*Primary Examiner*—Marcus Charles
(74) *Attorney, Agent, or Firm*—Harness, Dickey & Pierce, P.L.C.

(57) ABSTRACT

A vehicle wheel bearing apparatus has an outer member with a body flange and double row outer raceway surfaces. An inner member includes a wheel hub and an inner ring. They include inner raceway surfaces arranged opposite to the double row outer raceway surfaces. Double row rolling elements are freely rollably contained between the outer and inner raceway surfaces. Outer side rolling elements of the double row rolling elements are balls and inner side rolling elements of the double row rolling elements are tapered rollers. A pitch circle diameter of the inner side tapered rollers is set smaller than that of the outer side balls. A substantially conical recess is formed at an outer side end portion of the wheel hub. The depth of the recess extends to at least near the bottom of the inner raceway surface of the wheel hub. The thickness of a portion of the wheel hub where the inner raceway surface is formed is set within a predetermined range. The outer side wall of the wheel hub has a constant thickness substantially along the inner surface of the recess.

12 Claims, 17 Drawing Sheets

U.S. PATENT DOCUMENTS

| | | | |
|---|---|---|---|
| 6,217,220 B1 * | 4/2001 | Ohkuma et al. | 384/489 |
| 7,004,637 B1 * | 2/2006 | Uyama et al. | 384/544 |
| 7,104,695 B2 * | 9/2006 | Shevket | 384/450 |
| 7,350,976 B2 * | 4/2008 | Ohtsuki et al. | 384/448 |
| 2004/0234183 A1 * | 11/2004 | Ohtsuki | 384/544 |
| 2004/0252927 A1 * | 12/2004 | Hirai et al. | 384/544 |
| 2005/0105840 A1 * | 5/2005 | Muranaka et al. | 384/544 |
| 2005/0111771 A1 | 5/2005 | Shevket | |
| 2005/0141798 A1 * | 6/2005 | Okasaka | 384/544 |
| 2005/0141799 A1 * | 6/2005 | Uyama et al. | 384/544 |
| 2006/0023984 A1 * | 2/2006 | Terada et al. | 384/544 |

FOREIGN PATENT DOCUMENTS

| | | |
|---|---|---|
| JP | 11-182537 | 7/1999 |
| JP | 2001-180210 | 7/2001 |
| JP | 2001-254749 | 9/2001 |
| JP | 2002-295505 | 10/2002 |
| JP | 2004-108449 | 4/2004 |
| JP | 2005-325902 | 11/2005 |
| JP | 2005-325903 | 11/2005 |

* cited by examiner

[Fig 1]
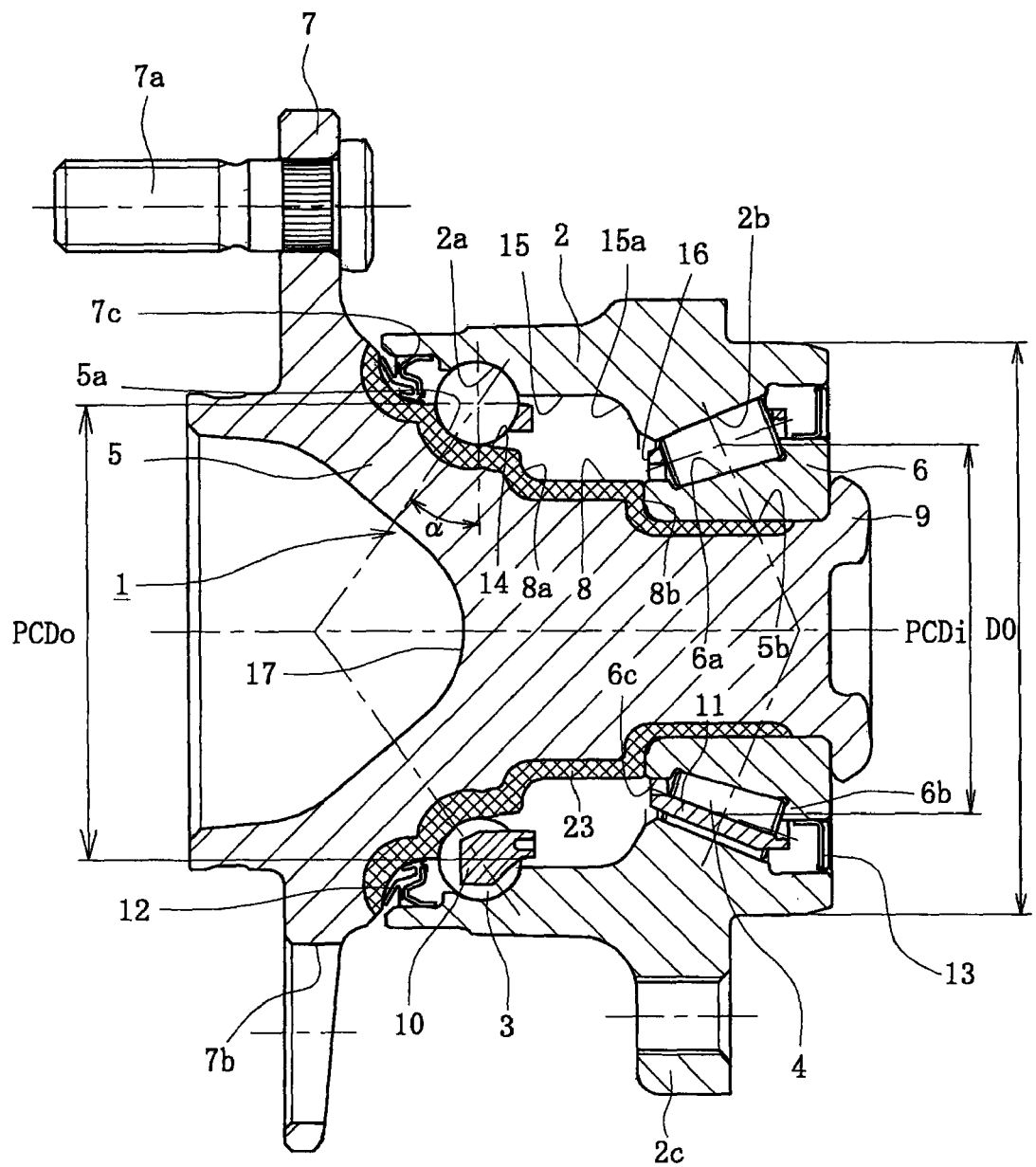

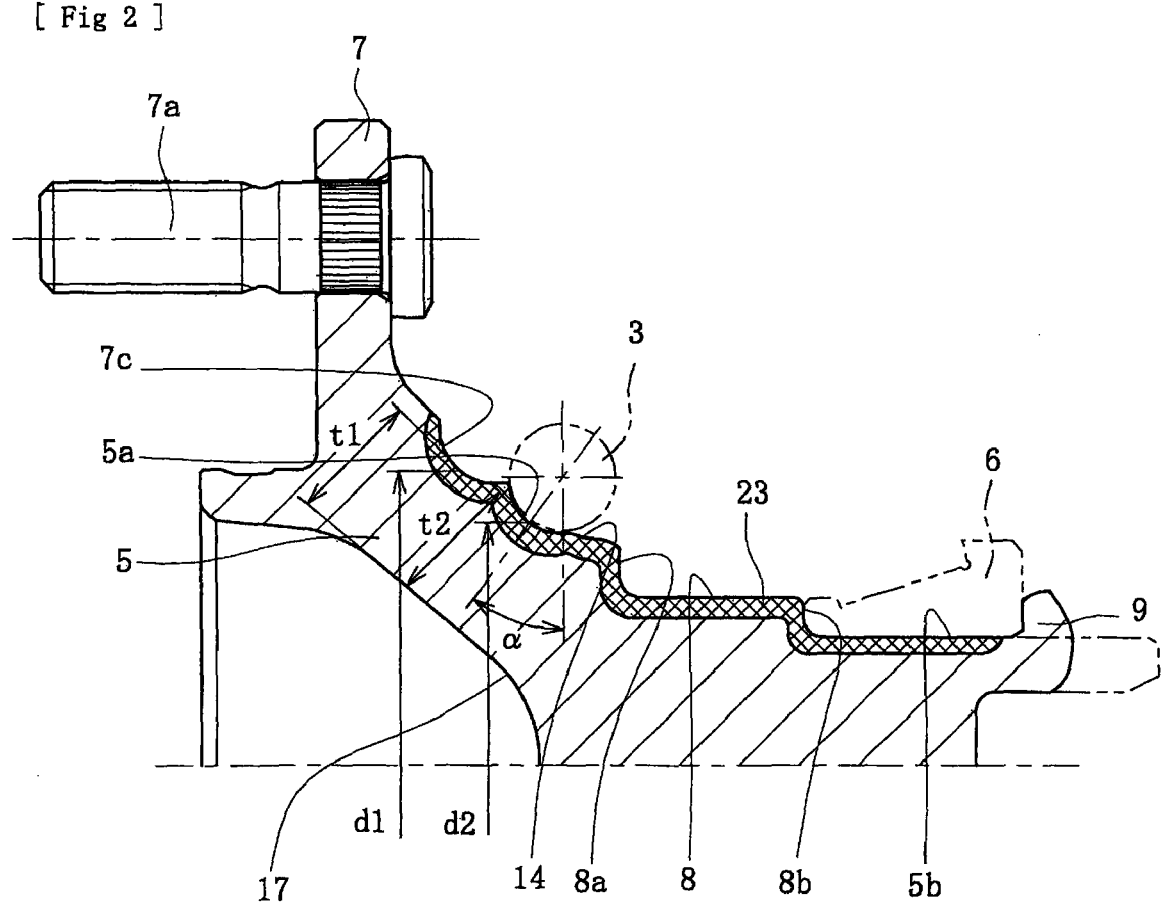
[Fig 2]

[Fig 3]
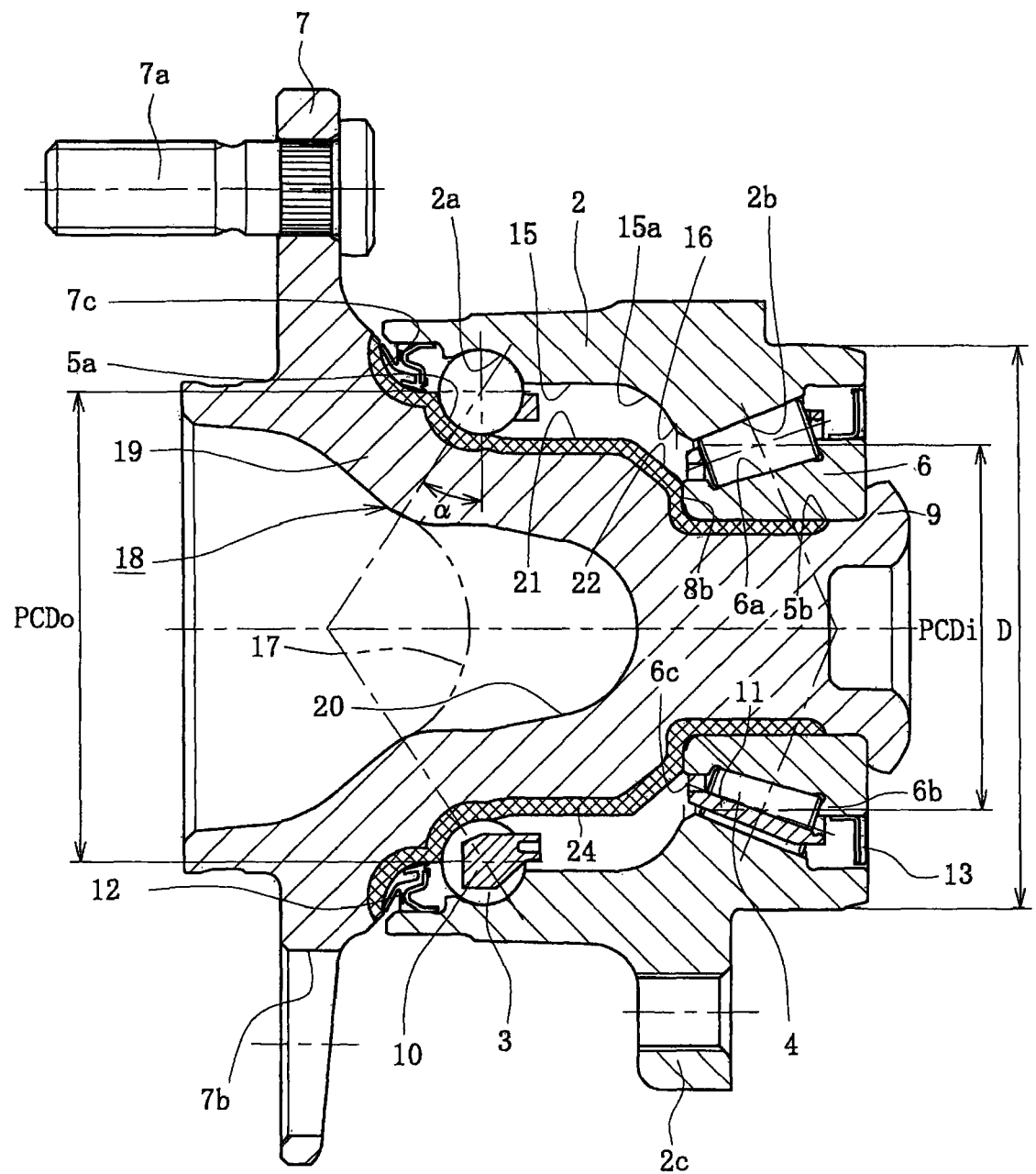

[Fig 4]
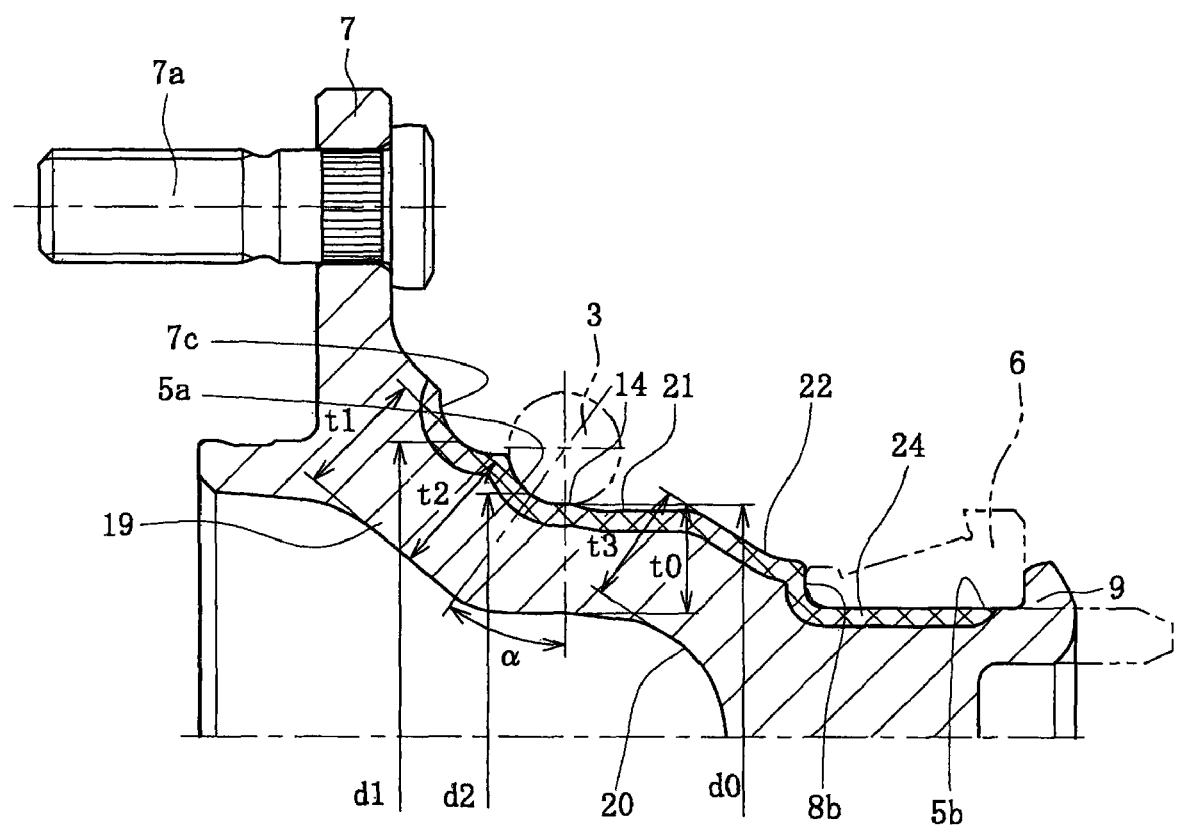

[Fig 5]
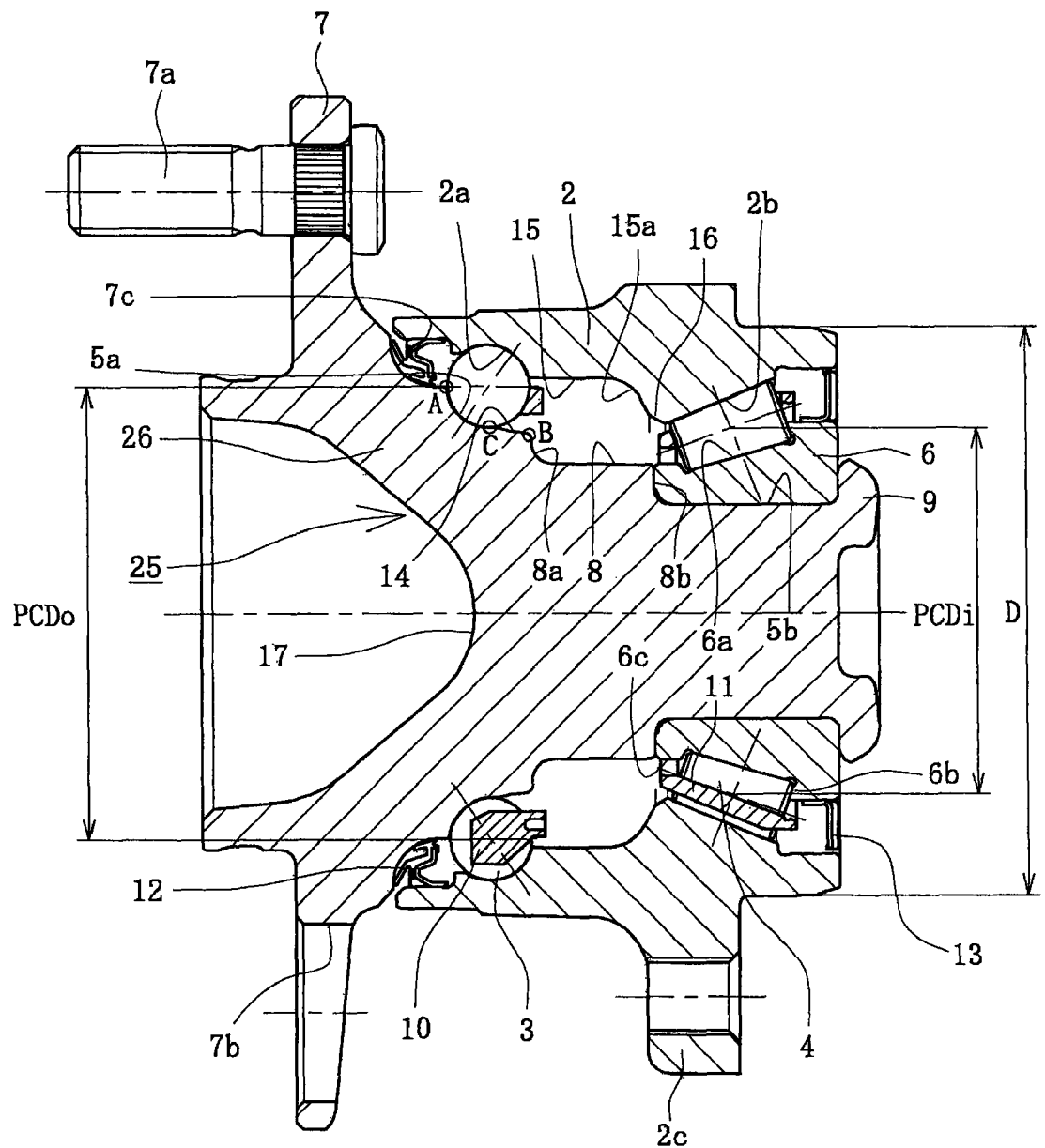

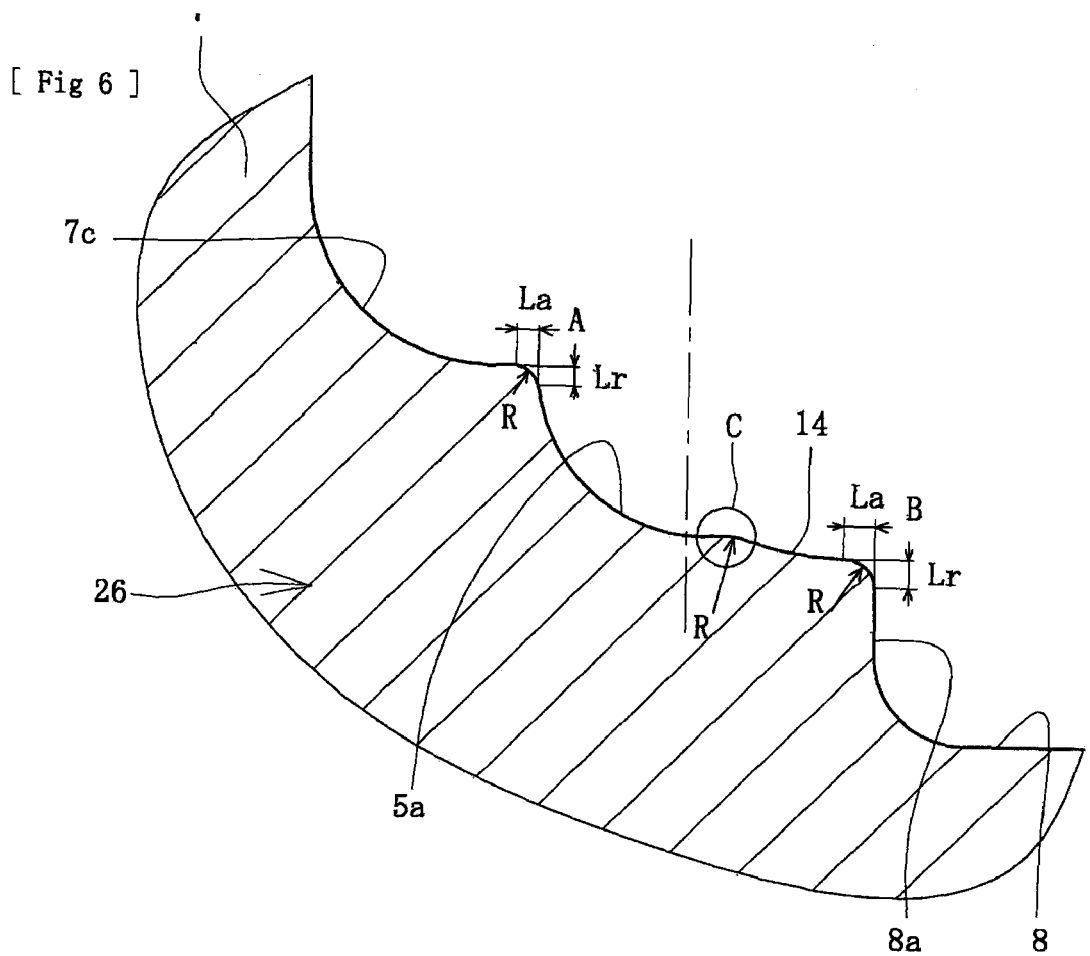
[Fig 6]
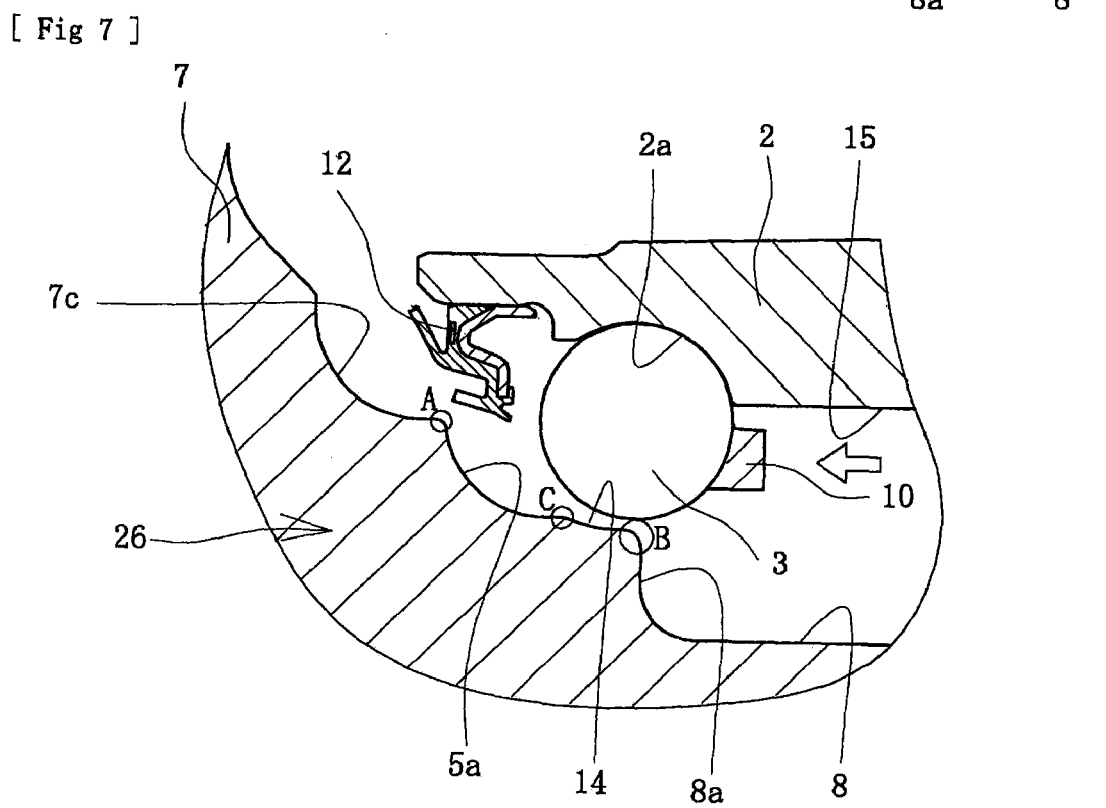
[Fig 7]

[Fig 8]
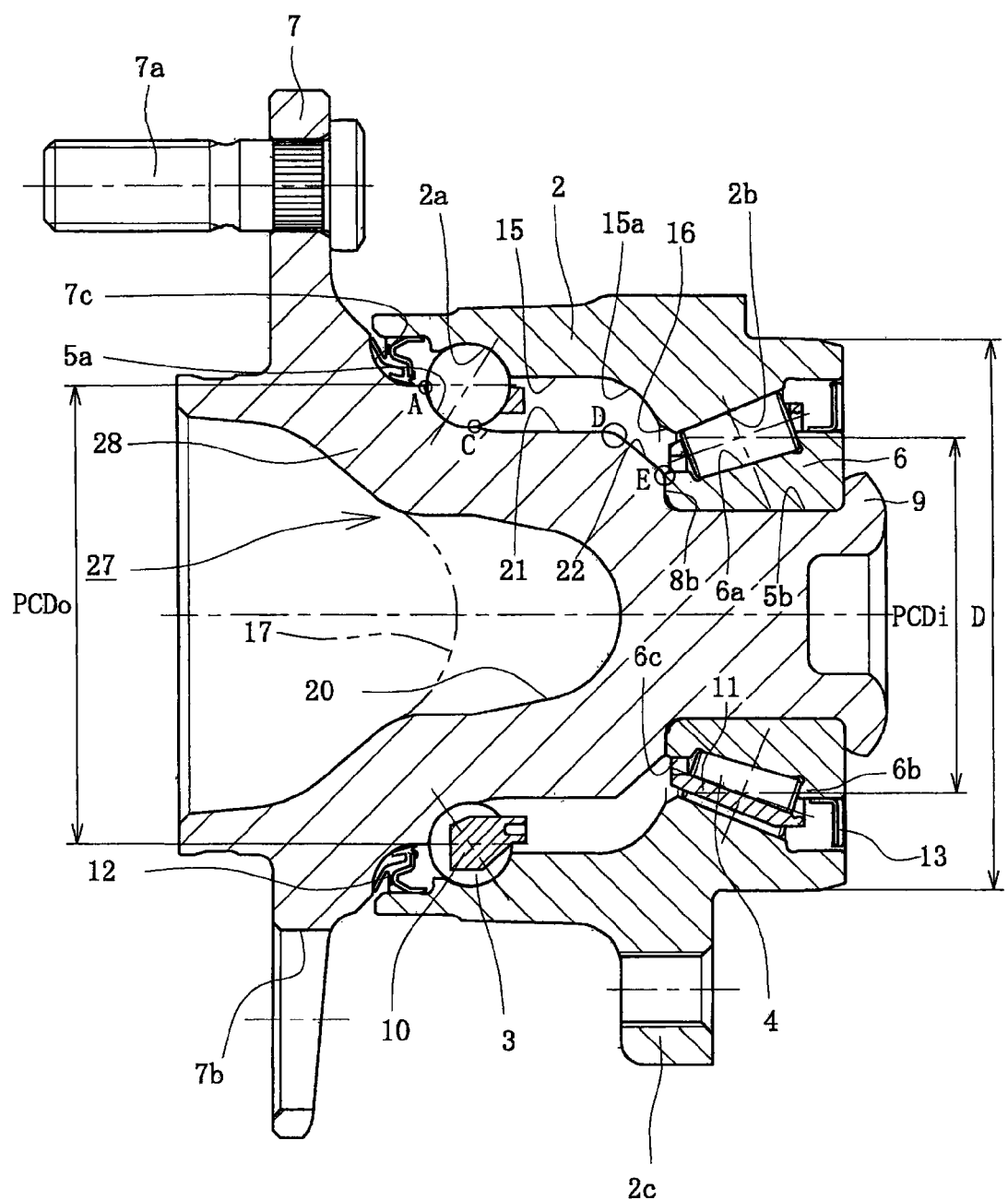

[ Fig 9 ]
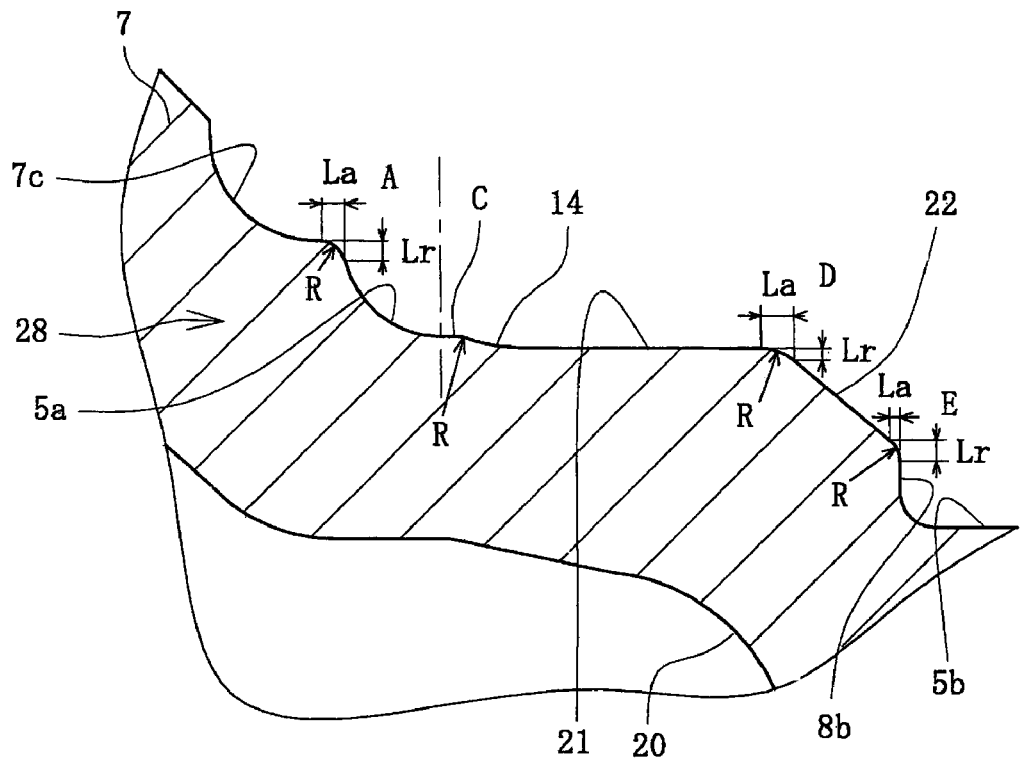
[ Fig 10 ]
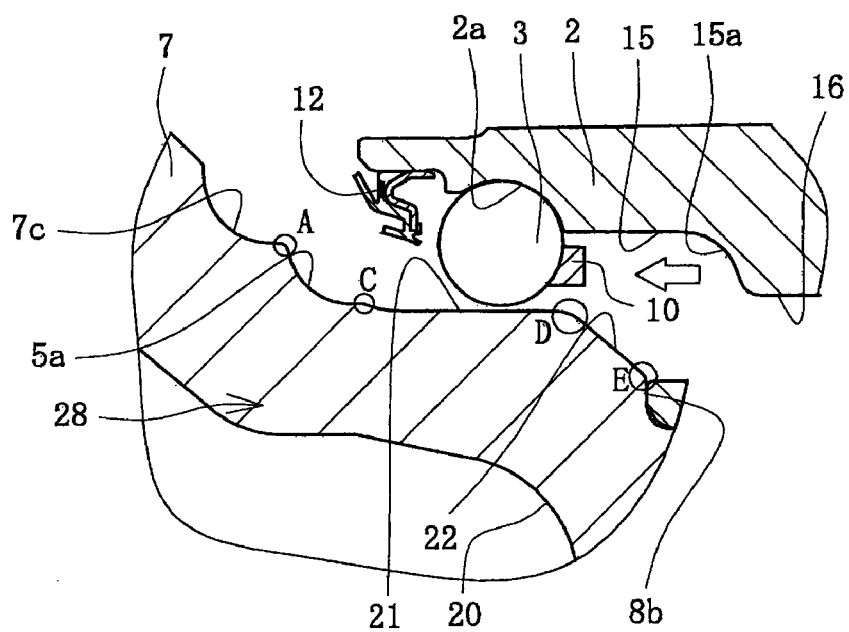

[Fig 11]
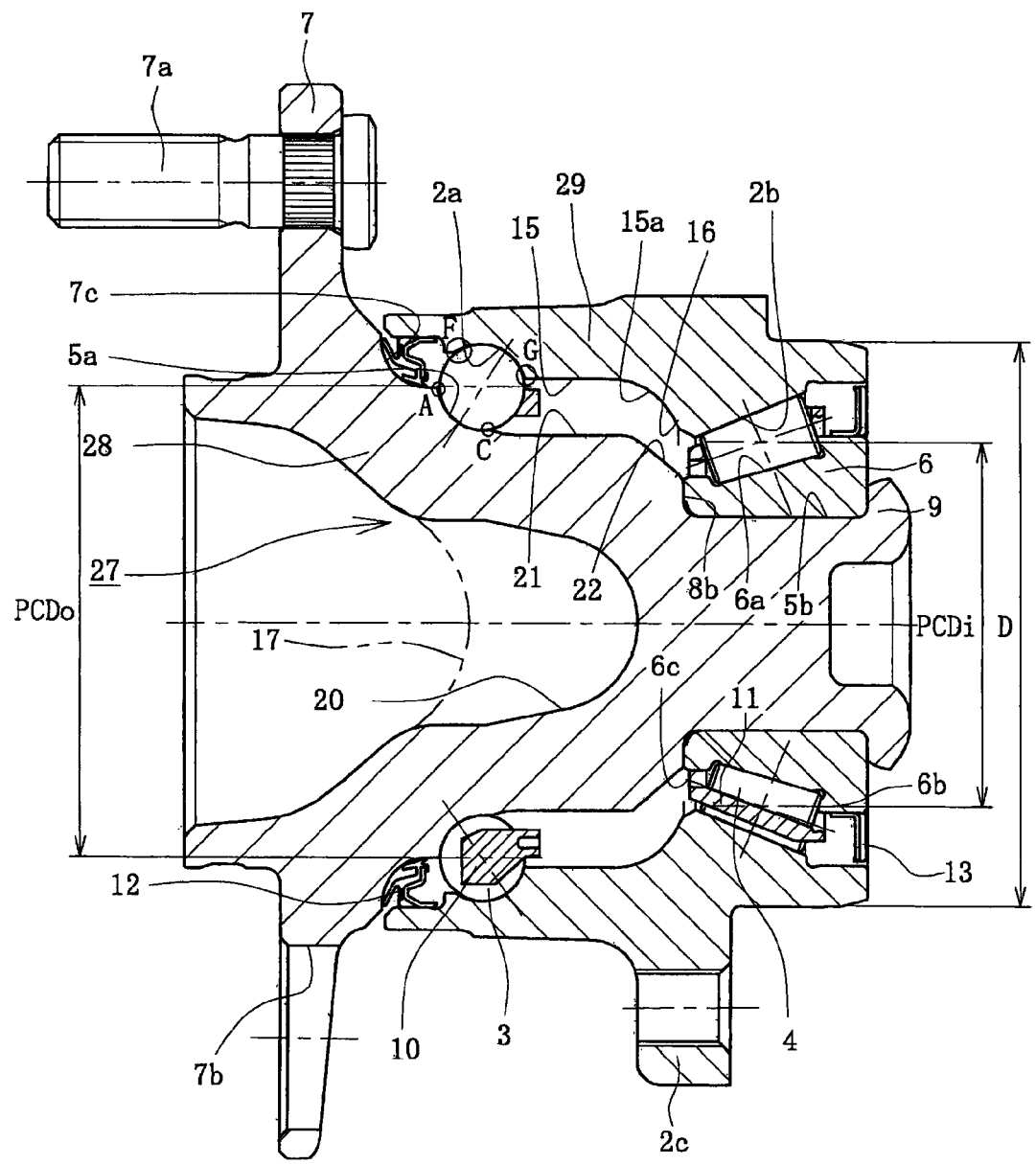

[Fig 12]
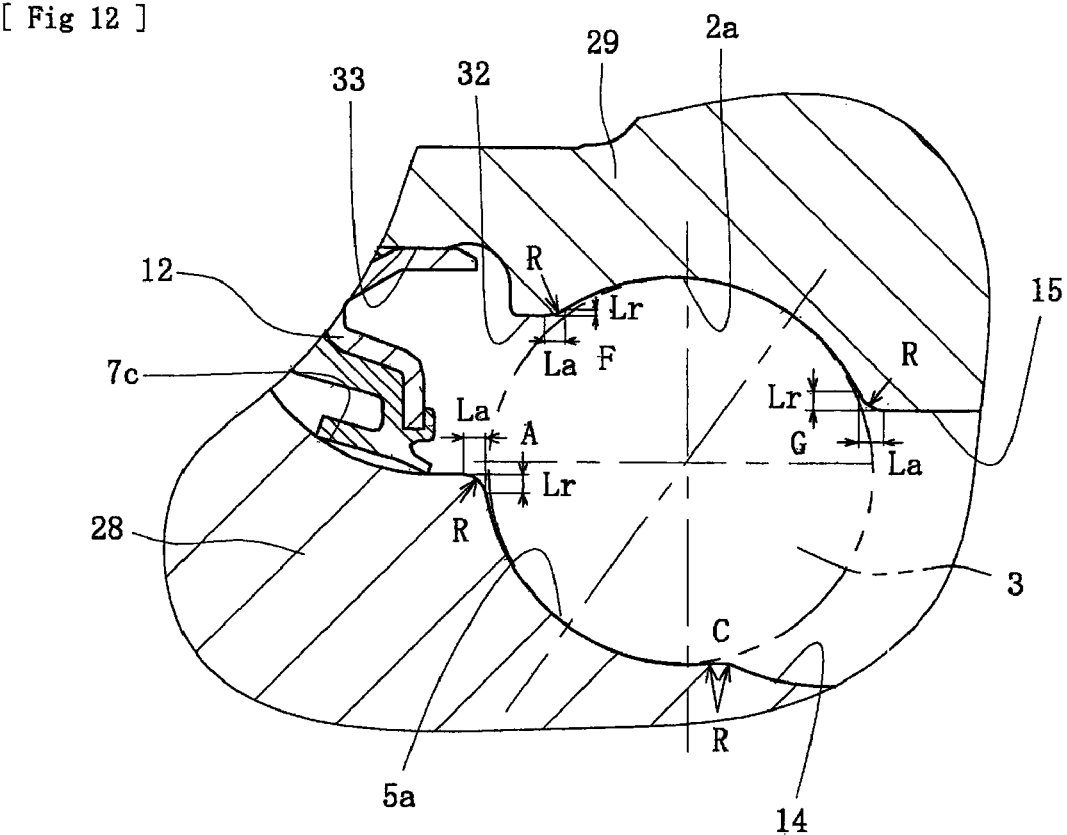
[Fig 13]
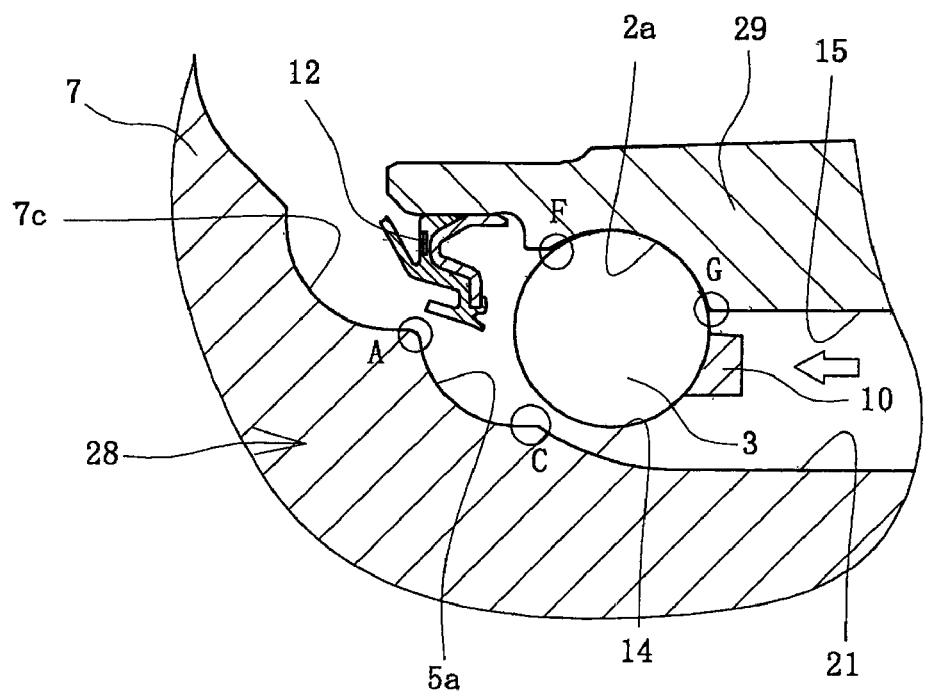

[ Fig 14 ]
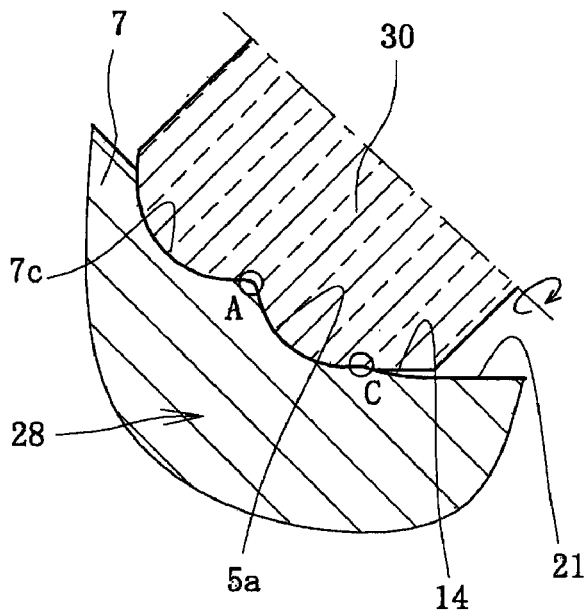
[ Fig 15 ]
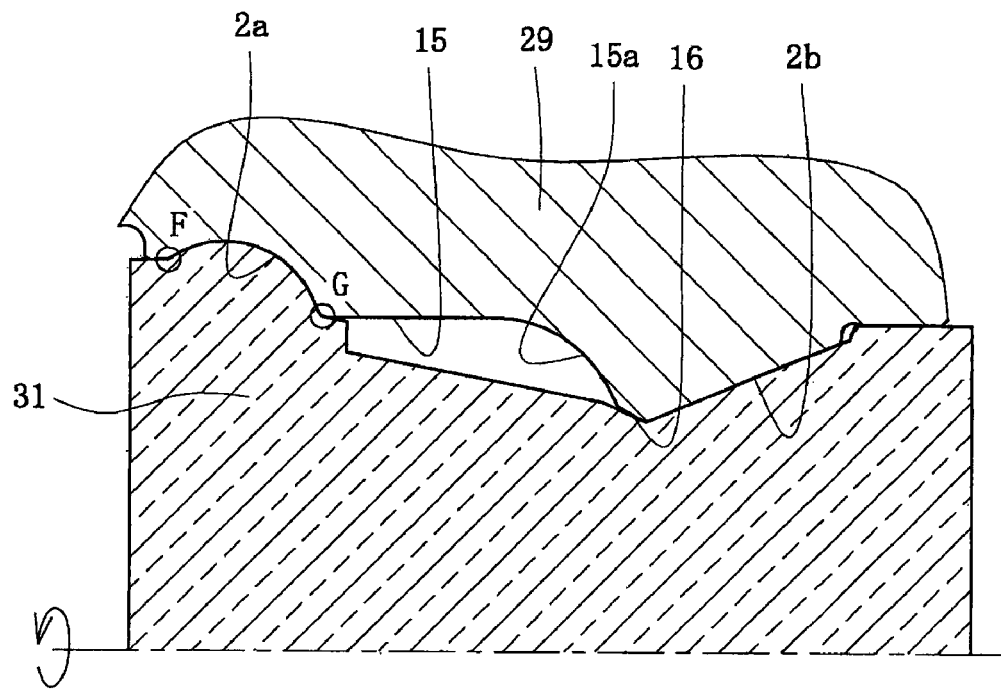

[ Fig 16 ]
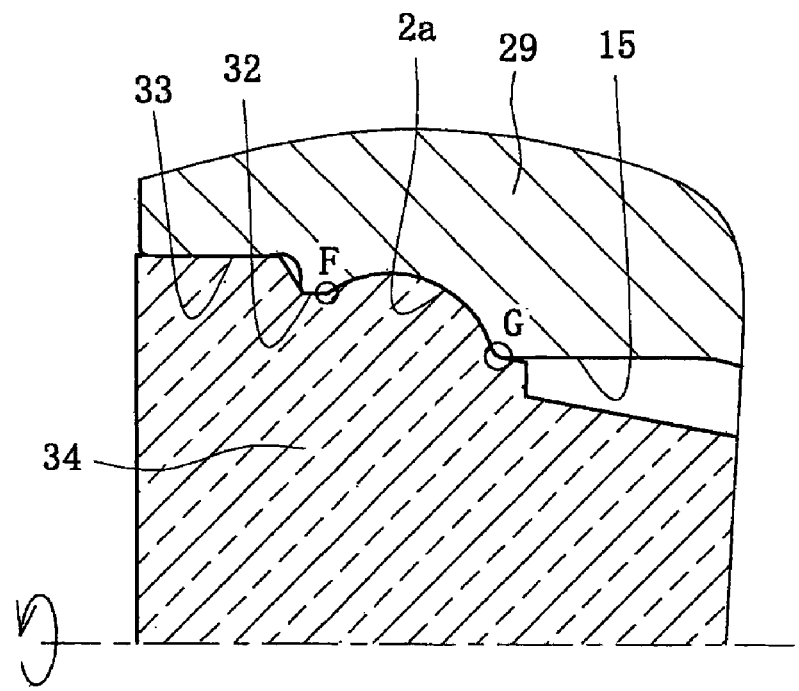
[ Fig 17 ]
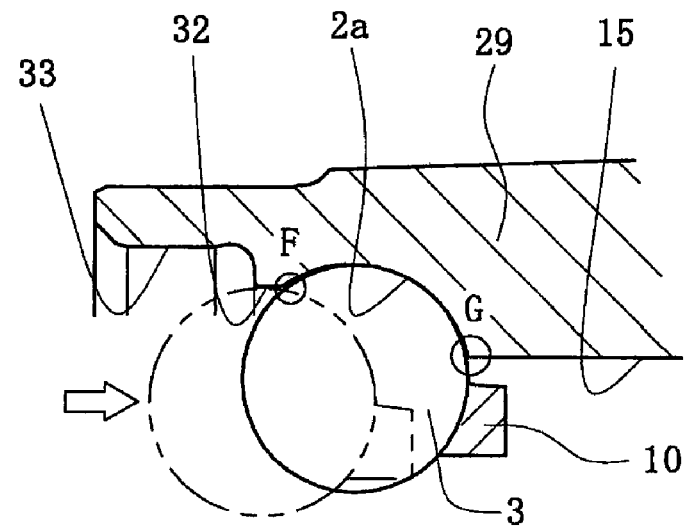

[Fig 18]
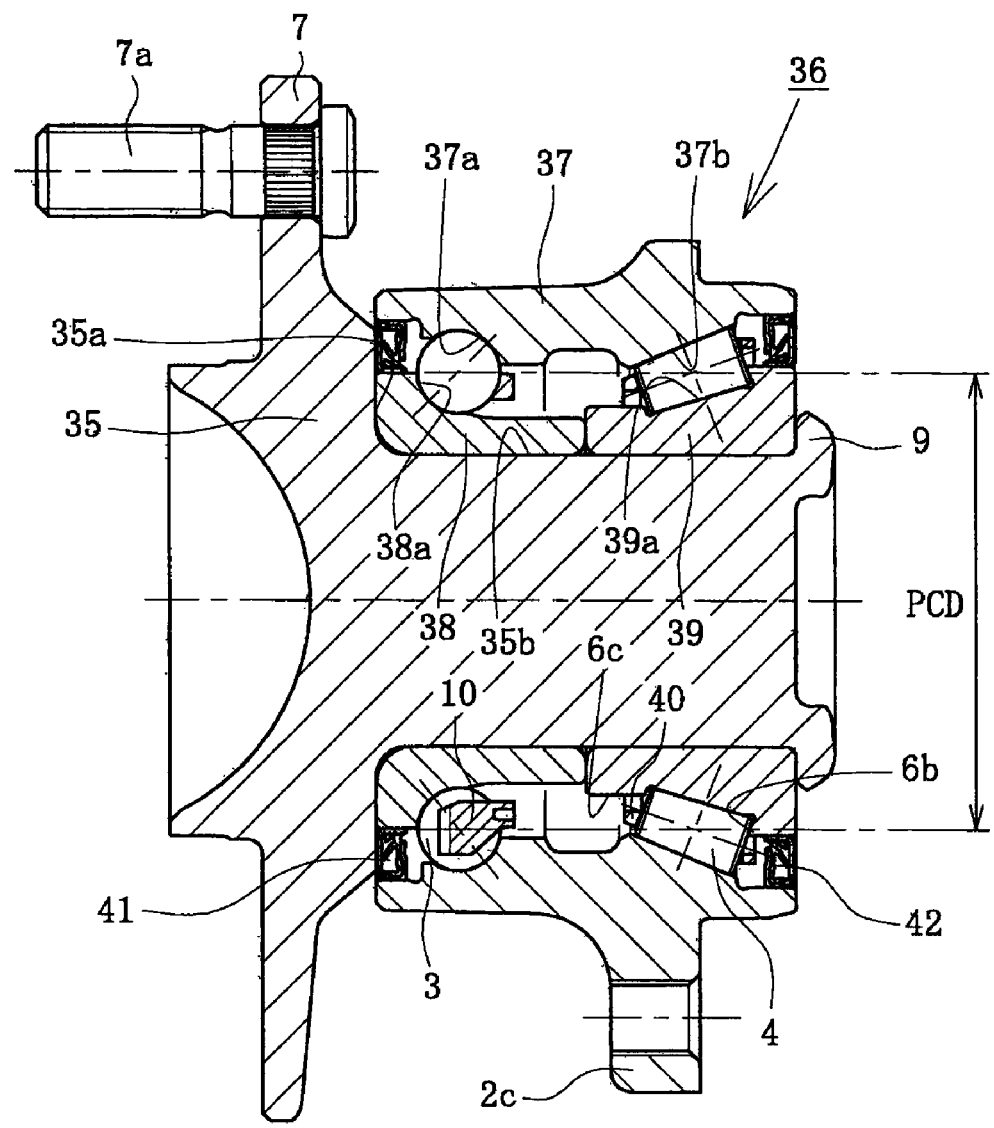

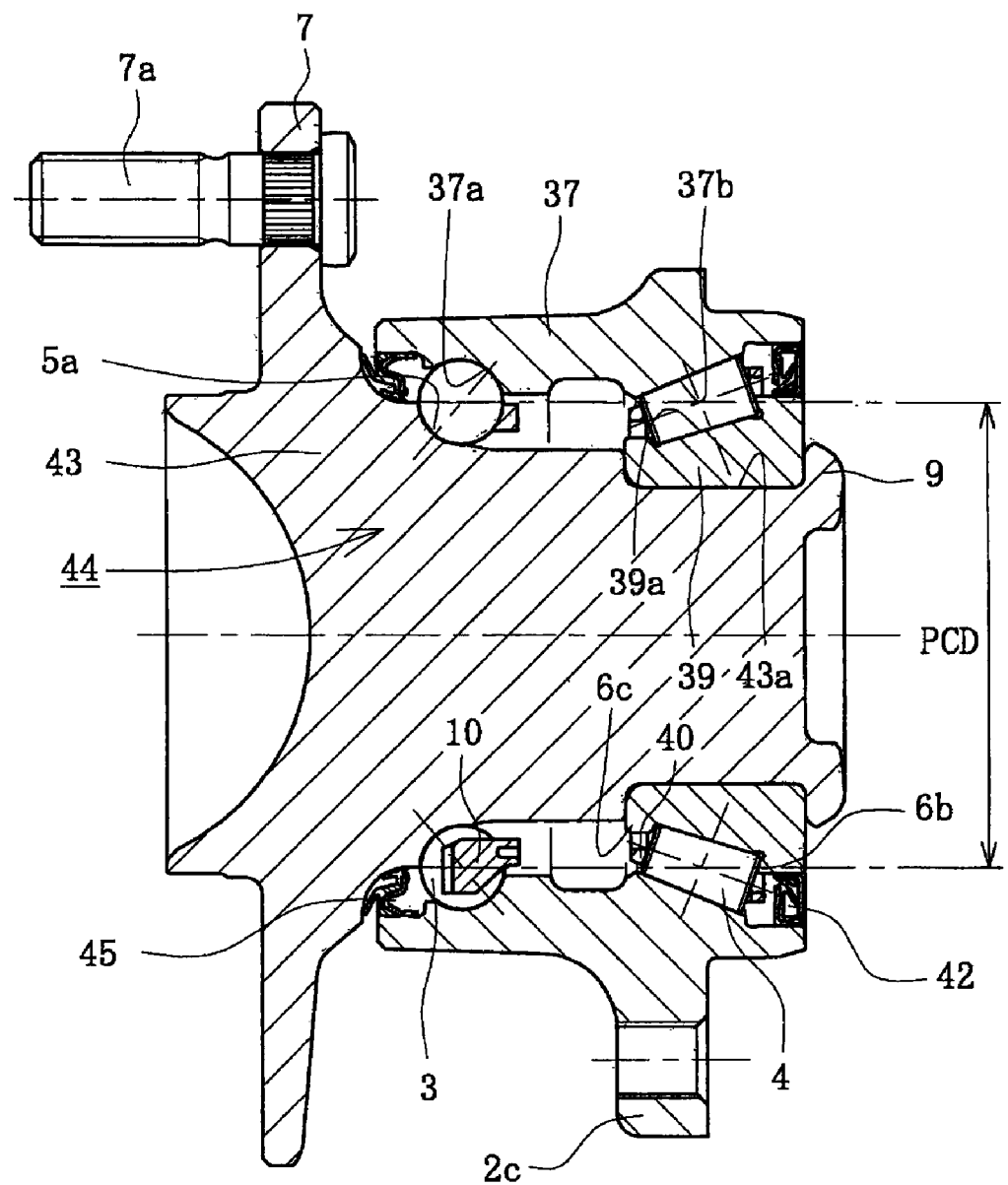
[Fig 19]

[Fig 20]
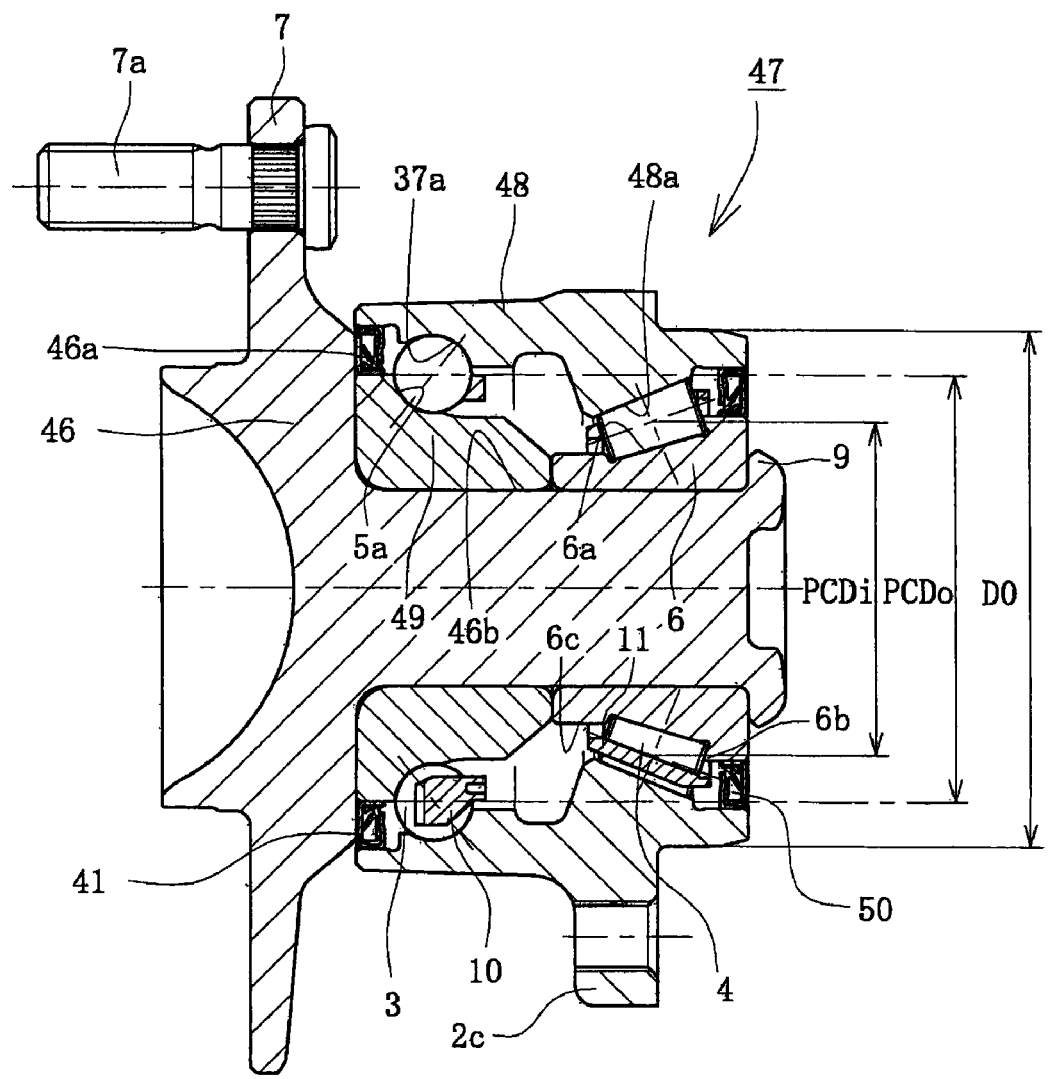

[Fig 21]
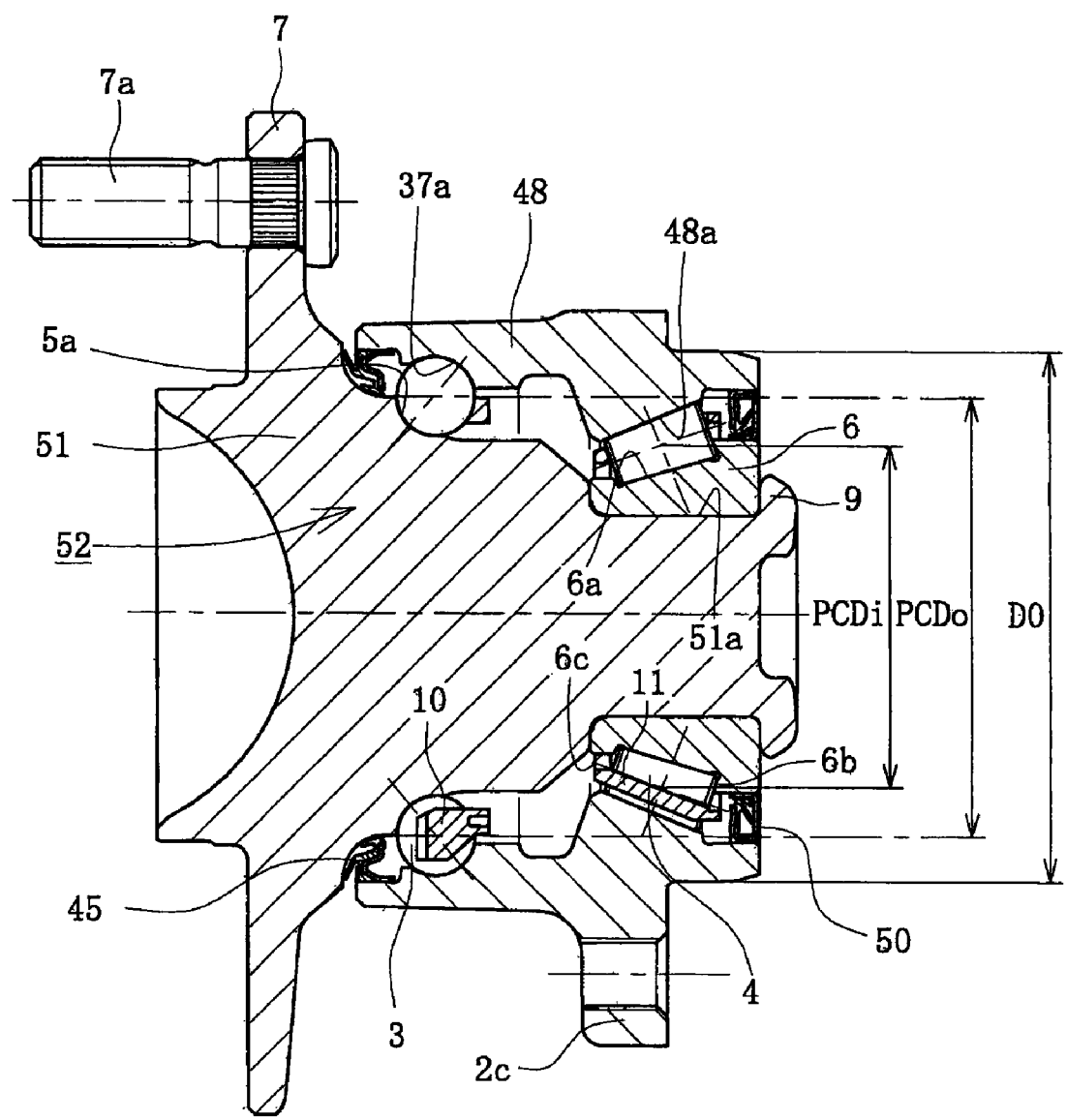

[Fig 22]
PRIOR ART
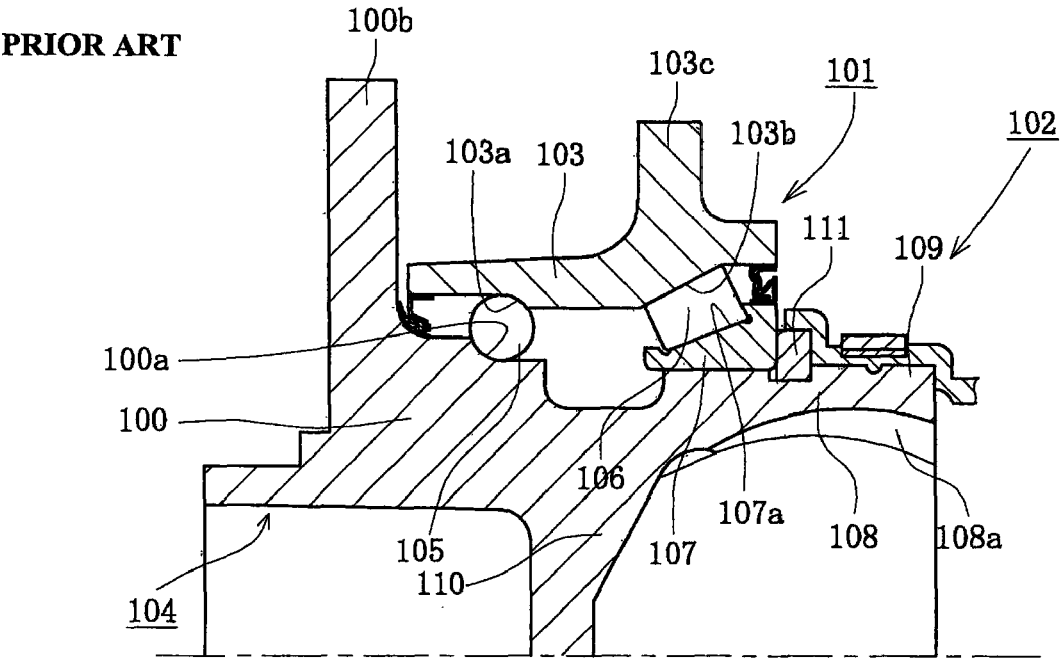
[Fig 23]
PRIOR ART
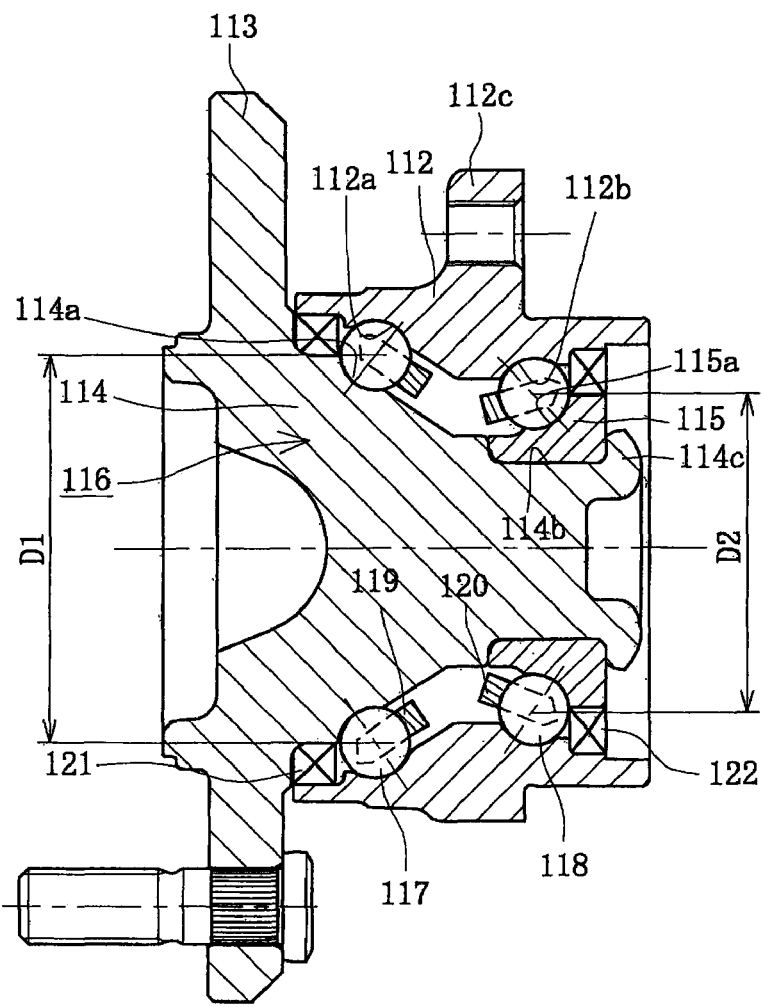

BEARING APPARATUS FOR A WHEEL OF VEHICLE

CROSS-REFERENCE TO RELATED APPLICATIONS

This application is a continuation of International Application No. PCT/JP2007/000453, filed Apr. 25, 2007, which claims priority to Japanese Application Nos. 2006-120449, filed Apr. 25, 2006; 2006-120450, filed Apr. 25, 2006; 2006-120451, filed Apr. 25, 2006; 2006-120452, filed Apr. 25, 2006; 2006-129034, filed May 8, 2006 and 2006-129913, filed May 9, 2006. The disclosures of the above applications are incorporated herein by reference.

FIELD

The present disclosure relates to a bearing apparatus to freely rotationally support a vehicle wheel of vehicle, a wheel bearing apparatus and, more particularly, to a wheel bearing apparatus that intends to increase its rigidity and strength so as to have an extended life.

BACKGROUND

Wheel bearing apparatus is used to freely rotationally supporting a wheel hub for mounting a wheel, via a rolling bearing, for driving wheels and driven wheels. For structural reasons, an inner ring rotation type is generally used for a driving wheel and both inner ring rotation and outer ring rotation types for a driven wheel. Double row angular ball bearings are widely used in such a bearing apparatus. This is due to the fact that it has a desirable bearing rigidity, high durability against misalignment and small rotation torque superior, for fuel consumption. On the other hand, double row tapered roller bearings are used for heavy weight vehicles such as off-road cars or trucks.

Vehicle wheel bearing apparatus is broadly classified into a number of structures. A first generation type has a wheel bearing with double row angular contact ball bearings fit between a knuckle, forming part of a suspension, and a wheel hub. A second generation type has a body mounting flange or a wheel mounting flange directly formed on the outer circumference of an outer member. A third generation type has one of the inner raceway surfaces directly formed on the outer circumference of the wheel hub. A fourth generation type has the inner raceway surfaces directly formed on the outer circumferences of the wheel hub and the constant velocity universal joint.

The wheel bearing apparatus shown in FIG. 22 is a fourth generation type. It is superior for its light weight and small size. It includes a unit of a wheel hub 100, a double row rolling bearing 101, and a constant velocity universal joint 102. The double row rolling bearing 101 has an outer member 103, an inner member 104, and a plurality of balls 105 and tapered rollers 106 contained between the outer and inner members 103, 104. In the descriptions below, the term "outer side" defines a side positioned outside of a vehicle body (left-hand side in drawings). The term "inner side" defines a side that is positioned inside of the vehicle body (right-hand side in drawings) when the bearing apparatus is mounted on the vehicle body.

The outer member 103 is formed with the body mounting flange 103c on its outer circumference. The body mounting flange 103c is mounted on a knuckle (not shown) forming part of a suspension of the vehicle. The outer member inner circumference has double row outer raceway surfaces 103a, 103b. A diameter of the outer side outer raceway surface 103a is set smaller than that of the inner side outer raceway surface 103b. The inner member 104 has a wheel hub 100, an outer joint member 108 of the constant velocity universal joint 102 integrally formed with the wheel hub 100, and a separate inner ring 107 press-fit onto the outer joint member 108.

The wheel hub 100 is formed on one end with a wheel mounting flange 100b to mount a wheel (not shown). Its outer circumference has an inner raceway surface 100a arranged opposite to the outer side outer raceway surface 103a of the double row outer raceway surfaces 103a, 103b. The outer circumference of the inner ring 107 has an inner raceway surface 107a arranged opposite to the inner side outer raceway surface 103b of the double row outer raceway surfaces 103a, 103b.

The constant velocity universal joint 102 has the outer joint member 108. It includes a cup-shaped mouth portion 109 and a shoulder portion 110 that forms a bottom portion of the mouth portion 109. The inner circumference of the outer joint member 108 is formed with curved track grooves 108a. The inner ring 107 is press-fit onto the outer circumference of the mouth portion 109 and axially immovably secured by a snap ring 111.

The plurality of balls 105 are freely rollably contained between the outer side outer and inner raceway surfaces 103a, 100a. The plurality of tapered rollers 106 are freely rollably contained between the inner side outer and inner raceway surfaces 103b, 107a. The pitch circle diameter of the outer side balls 105 is set smaller than the inner side tapered rollers 106. This enables the fundamental rated load of the inner side rolling elements, to which a larger load is applied than a load applied to the outer side rolling elements, to be larger than the fundamental rated load of the outer side rolling elements. Thus, this enables the life of the outer side and inner side rolling elements to be substantially the same as each other and to obtain a smart design (see e.g. Japanese Laid-open Patent publication No. 91308/1999).

In such a wheel bearing apparatus, since the inner ring 107 is secured on the mouth portion 109 of the outer joint member 108, the size of the apparatus can be reduced in its axial direction. However, since the outer diameter of the outer member 103 is enlarged, not only is the reduction of the weight of the wheel bearing apparatus hampered but also its design modification of related parts, such as a knuckle, is required. To solve such a problem, the wheel bearing apparatus shown in FIG. 23 has been proposed.

This wheel bearing apparatus is formed by a double row angular contact ball bearing with an outer member 112. The outer member 112 is formed with a body mounting flange 112c on its outer circumference. The body mounting flange 112c is to be mounted on a knuckle (not shown) of a vehicle. The outer member inner circumference 112 has double row outer raceway surfaces 112a, 112b. An inner member 116 includes a wheel hub 114 formed on its one end with a wheel mounting flange 113 to mount a wheel (not shown). Its outer circumference has an inner raceway surface 114a arranged opposite to the outer side outer raceway surface 112a of double row outer raceway surfaces 112a, 112b. A cylindrical portion 114b axially extends from the inner raceway surface 114a. An inner ring 115 has an inner raceway surface formed on its outer circumference. The inner raceway surface 115a is arranged opposite to the inner side outer raceway surface 112b of the double row outer raceway surfaces 112a, 112b. Double row balls 117, 118 are freely rollably contained between the outer raceway surfaces and inner raceway surfaces. Cages 119, 120 freely rollably hold the double row balls 117, 118.

The inner ring 115 is axially secured by a caulked portion 114c. It is formed by plastically deforming the end of the cylindrical portion 114b of the wheel hub 114 radially outward. Seals 121, 122 are mounted within annular openings formed between the outer member 112 and the inner member 116. The seals prevent leakage of lubricating grease sealed within the bearing and rain water or dusts from entering into the bearing from the outside.

In this wheel bearing apparatus, a pitch circle diameter D1 of the outer side row of balls 117 is set larger than a pitch circle diameter D2 of the inner side row of balls 118. Accordingly, the diameter of the inner raceway surface 114a of the wheel hub 114 is larger than that of the inner raceway surface 115a of the inner ring 115. The diameter of the outer side outer raceway surface 112a of the outer member 112 is larger than that of the inner side outer raceway surface 112b. In addition, the number of the outer side balls 117 is larger than the number of inner side balls 118. By setting the relation between the pitch circle diameters D1, D2 as D1>D2, it is possible to increase the rigidity of the wheel bearing apparatus not only in the case of running in a straight way but also in case of running in a curved way. Thus, this extends the life of the wheel bearing apparatus (see e.g. Japanese Laid-open Patent publication No. 108449/2004).

SUMMARY

In the prior art wheel bearing apparatus, the pitch circle diameter D1 of the of the outer side row of balls 117 is set larger than the pitch circle diameter D2 of the inner side row of balls 118. Thus, the diameter of the inner raceway surface 114a of the wheel hub 114 is larger than that of the inner raceway surface 115a of the inner ring 115. Accordingly, it is possible to increase the rigidity of the outer side bearing row and to extend the life of the wheel bearing apparatus. However, such a structure leads to a reduction of the rigidity of the inner side bearing row as compared with the rigidity of the outer side bearing row. In addition, since the outer side portion of the wheel hub 114 is enlarged in its outer circumference on which the inner raceway surfaces 114a are formed, it is inevitable that the total weight of the wheel hub 114 is increased. Thus, the reduction of the weight of the bearing apparatus is limited.

It is, therefore, an object to provide a wheel bearing apparatus that can simultaneously solve the antinomic problems of reducing the weight and size of the wheel bearing apparatus and increasing its rigidity and strength.

A vehicle wheel bearing apparatus comprises an outer member formed with a body mounting flange on its outer circumference. The body mounting flange is to be mounted on a knuckle of a vehicle. Its inner circumference has double row outer raceway surfaces. An inner member includes a wheel hub and an inner ring. The wheel hub has an integrally formed wheel mounting flange formed at one end. Its outer circumference has one inner raceway surface arranged opposite to one of the double row outer raceway surfaces. A cylindrical portion axially extends from the inner raceway surface. The inner ring is fit onto the cylindrical portion of the wheel hub, via a predetermined interference. Its outer circumference has the other inner raceway surface arranged opposite to the other of the double row outer raceway surfaces. Double row rolling elements are freely rollably contained between the outer and inner raceway surfaces, respectively, of the outer member and the inner member. The outer side rolling elements of the double row rolling elements are balls. The inner side rolling elements of the double row rolling elements are tapered rollers. A pitch circle diameter of the inner side tapered rollers is set smaller than that of the outer side balls. A substantially conical recess is formed at an outer side end portion of the wheel hub. The depth of the recess extends to at least near the bottom of the inner raceway surface of the wheel hub. The thickness of a portion of the wheel hub at the inner raceway surface is formed and set within a predetermined range. The outer side wall of the wheel hub is formed with a constant thickness substantially along the inner surface of the recess.

According to the wheel bearing apparatus of the third generation type, it comprises an outer member formed with a body mounting flange on its outer circumference. An inner member includes a wheel hub having at one end a wheel mounting flange. An inner ring is press fit onto the wheel hub. Double row rolling elements are freely rollably contained between the outer and inner members. The outer side rolling elements of the double row rolling elements are balls. The inner side rolling elements of the double row rolling elements are tapered rollers. A pitch circle diameter of the inner side tapered rollers is set smaller than that of the outer side balls. A substantially conical recess is formed at an outer side end portion of the wheel hub. The depth of the recess extends to at least near the bottom of the inner raceway surface of the wheel hub. The thickness of a portion of the wheel hub at the inner raceway surface is formed and set within a predetermined range. The outer side wall of the wheel hub is formed with a constant thickness substantially along the inner surface of the recess. Thus, it is possible to provide a wheel bearing apparatus that simultaneously solve the antinomic problems of reducing the weight and size of the wheel bearing apparatus and increases its rigidity and strength.

It is preferable that a predetermined hardened layer is continuously formed by high frequency induction quenching in a region from the inner side base of the wheel mounting flange of the wheel hub to the cylindrical portion. It includes the inner raceway surface of the wheel hub. The outer side wall thickness of the wheel hub is set larger than two times the depth of the hardened layer. This makes it possible to prevent the generation of cracks during the high frequency induction quenching.

It is preferable that a wall thickness of the wheel hub in a direction of the ball contact angle $\alpha$ on the inner raceway surface is set at a range of 0.2~0.3 times the diameter of the ball contact point on the inner raceway surface. This makes it possible to reduce the weight of the wheel bearing apparatus while keeping its strength and rigidity corresponding to its using conditions.

A shaft shaped portion extends from the bottom of the inner raceway surface of the wheel hub to the cylindrical portion. A tapered step portion is formed between the shaft shaped portion and a shoulder portion. The inner ring abuts against the shoulder portion. The depth of the recess extends to near the step portion beyond the bottom of the inner raceway surface. The wall thickness of the wheel hub in a direction of the ball contact angle $\alpha$ on the inner raceway surface is set thicker than the wall thickness at the bottom of the inner raceway surface of the wheel hub. This makes it possible to keep the strength and rigidity and to achieve a further reduction of weight of the wheel bearing apparatus.

The inner ring is axially secured on the wheel hub with a predetermined pre-load applied by a caulked portion. The caulking portion is formed by plastically deforming radially outward the end of the cylindrical portion of the wheel hub. This makes it possible to further reduce the weight and size of the wheel bearing apparatus and to keep the initially set pre-load for a long term.

Each corner portion on the outer circumference of the hub is rounded to have a smooth circular arc configuration. This prevents generation of damages on balls during assembly of the wheel bearing assembly. Accordingly, this improves its noise characteristics.

The shoulder portion and counter portions of the outer side inner raceway surface are simultaneously ground, by a formed grinding wheel, with the inner raceway surface after heat treatment. This makes it possible to further smoothly finish connections between sections of outer side raceway surface.

At least a corner portion of the counter portion of each raceway surface in the outer side bearing row is rounded to have a smooth circular arc configuration. This prevents the generation of damages on the balls during assembly of the wheel bearing assembly. Additionally, this improves its noise characteristics.

A corner portion of the shoulder portion of each raceway surface in the outer side bearing row is rounded to have a smooth circular arc configuration. This makes it possible to suppress the generation of "edge load" even though the oval contacting region rides over the shoulders of the raceway surfaces. Thus, this extends the life of the wheel bearing apparatus.

The counter portion and shoulder portion of the raceway surface of the outer side bearing row are ground, by a formed grinding wheel, simultaneously with the corresponding raceway surface after heat treatment. This makes it possible to further smoothly finish the connections between sections of outer side raceway surface.

The surface roughness of inner circumferential surface of the counter portion of the outer member is limited to less than 3.2 Ra. This prevents the generation of damage on the balls during assembly of the wheel bearing assembly. Thus, it improves the noise characteristics.

The counter portion, shoulder portion and the inner circumferential surface of each raceway surface of the outer side bearing row are ground, by a formed grinding wheel, simultaneously with the corresponding raceway surface, after heat treatment. This makes it possible to further smoothly finish the connections between sections of outer side raceway surface.

A vehicle wheel bearing apparatus comprises an outer member formed with a body mounting flange on its outer circumference. The body mounting flange mounts onto a knuckle of a vehicle. Its inner circumference includes double row outer raceway surfaces. An inner member includes a wheel hub and at least one inner ring. The wheel hub has an integrally formed wheel mounting flange at its one end. Its outer circumference has one inner raceway surface arranged opposite to one of the double row outer raceway surfaces. A cylindrical portion axially extends from the inner raceway surface. The inner ring fits onto the cylindrical portion of the wheel hub. The inner ring is formed, on its outer circumference, with the inner raceway surface arranged opposite to the double row outer raceway surfaces. Double row rolling elements are freely rollably contained between the outer and inner raceway surfaces, respectively, of the outer member and the inner member. At least one inner ring is axially secured on the wheel hub by plastically deforming, radially outward, the end of the cylindrical portion of the wheel hub. Outer side rolling elements of the double row rolling elements are balls. Inner side rolling elements of the double row rolling elements are tapered rollers. The inner ring has a predetermined pre-load applied by a caulked portion under a condition where the inner ring of the caulked side abuts against the shoulder portion or the adjacent inner ring.

The wheel bearing apparatus of the second or third generation type comprises the double row rolling elements. The inner ring is axially secured on the wheel hub by swing motion caulking. The outer side rolling elements of the double row rolling elements are balls. The inner side rolling elements of the double row rolling elements are tapered rollers. The inner ring has a predetermined pre-load applied by a caulked portion under a condition where the inner ring of the caulked side abuts against the shoulder portion or the adjacent inner ring. Thus, the wheel bearing apparatus simultaneously solves the antinomic problems of reducing the weight and size of the wheel bearing apparatus and increases its rigidity and strength. In addition, it is possible to have a wheel bearing apparatus with a long life even though the load applied to the inner side bearing row exceeds the load applied to the outer side bearing row. Thus, the wheel bearing apparatus has improved strength and durability.

A pitch circle diameter of the inner side tapered roller row is set smaller than that of the outer side ball row. This makes it possible to set the inner side outer diameter of the outer member small. Thus, this reduces the knuckle size without reducing the fundamental rated load of the inner side bearing row. Accordingly, it reduces the weight and size of the wheel bearing apparatus.

The number of balls of the outer side ball row is larger than the number of tapered rollers on the inner side tapered roller row. This makes it possible to increase the whole rigidity of the wheel bearing apparatus.

A pair of inner rings are press fit onto the cylindrical portion of the wheel hub. The inner diameter of both the inner rings is set the same. This makes it possible to make the configuration of the cylindrical portion of the wheel hub straight. This improves its workability.

The outer side inner raceway surface is directly formed on the outer circumference of the wheel hub. The cylindrical portion extends from the outer side inner raceway surface toward the inner side. The inner ring is press fit onto the cylindrical portion via a predetermined interference. This makes it possible to further reduce the weight and size of the wheel bearing apparatus.

The vehicle wheel bearing apparatus comprises an outer member formed with a body mounting flange on its outer circumference. The body mounting flange mounts onto a knuckle of a vehicle. Its inner circumference includes double row outer raceway surfaces. An inner member includes a wheel hub and an inner ring. The wheel hub has an integrally formed wheel mounting flange at one end. The wheel hub outer circumference has one inner raceway surface arranged opposite to one of the double row outer raceway surfaces. A cylindrical portion axially extends from the inner raceway surface. The inner ring is fit onto the cylindrical portion of the wheel hub via a predetermined interference. The inner ring outer circumference has the other inner raceway surface arranged opposite to the other of the double row outer raceway surfaces. Double row rolling elements are freely rollably contained between the outer and inner raceway surfaces, respectively, of the outer member and the inner member. The outer side rolling elements of the double row rolling elements are balls. The inner side rolling elements of the double row rolling elements are tapered rollers. A pitch circle diameter of the inner side tapered rollers is set smaller than that of the outer side balls. A substantially conical recess is formed at an outer side end portion of the wheel hub. The depth of the recess extends to at least near the bottom of the inner raceway surface of the wheel hub. The thickness of a portion of the wheel hub where the inner raceway surface is formed is set within a predetermined range. The outer side wall of the wheel hub has a constant thickness substantially along the inner surface of the recess. Thus, it is possible to provide a wheel bearing apparatus that can simultaneously solve the antinomic problems of reducing the weight and size of the wheel bearing apparatus and increases its rigidity and strength.

In addition, the vehicle wheel bearing apparatus comprises an outer member formed with a body mounting flange on its outer circumference. The body mounting flange is mounted on a knuckle of a vehicle. Its inner circumference includes double row outer raceway surfaces. An inner member includes a wheel hub and at least one inner ring. The wheel hub has an integrally formed wheel mounting flange at one end. The wheel hub outer circumference has one inner raceway surface arranged opposite to one of the double row outer raceway surfaces. A cylindrical portion axially extends from the inner raceway surface. The inner ring is fit onto the cylindrical portion of the wheel hub. The inner ring outer circumference has an inner raceway surface arranged opposite to the double row outer raceway surfaces. Double row rolling elements are freely rollably contained between the outer and inner raceway surfaces, respectively, of the outer member and the inner member. The at least one inner ring is axially secured on the wheel hub by plastically deforming, radially outward, the end of the cylindrical portion of the wheel hub. The outer side rolling elements of the double row rolling elements are balls. The inner side rolling elements of the double row rolling elements are tapered rollers. The inner ring has a predetermined pre-load applied by a caulked portion under a condition where the inner ring of the caulked side abuts against the shoulder portion or the adjacent inner ring. Thus, it is possible to provide a wheel bearing apparatus that can simultaneously solve the antinomic problems of reducing the weight and size of the wheel bearing apparatus and increasing its rigidity and strength. In addition it is possible for the wheel bearing apparatus to have a long life even though the load applied to the inner side bearing row exceeds the load applied to the outer side bearing row. Thus, the wheel bearing apparatus is of a smart design and has improved strength and durability.

The vehicle wheel bearing apparatus comprises an outer member formed with a body mounting flange on its outer circumference. The body mounting flange is mounted on a knuckle of a vehicle. The outer member inner circumference has double row outer raceway surfaces. An inner member includes a wheel hub and an inner ring. The wheel hub has an integrally formed wheel mounting flange at one end. The wheel hub outer circumference has one inner raceway surface arranged opposite to one of the double row outer raceway surfaces. A cylindrical portion axially extends from the inner raceway surface. The inner ring is fit onto a cylindrical portion of the wheel hub via a predetermined interference. The inner ring outer circumference has the other inner raceway surface arranged opposite to the other of the double row outer raceway surfaces. Double row rolling elements are freely rollably contained between the outer and inner raceway surfaces, respectively, of the outer member and the inner member. A predetermined hardened layer is continuously formed by high frequency induction quenching. The layer is in a region from the inner side base of the wheel mounting flange of the wheel hub to the cylindrical portion including the inner raceway surface of the wheel hub. The inner ring is axially secured on the wheel hub by a caulked portion. The caulked portion is formed by plastically deforming, radially outward, the end of the cylindrical portion of the wheel hub. A pitch circle diameter of the inner side tapered roller row is set smaller than that of the outer side ball row. A substantially conical recess is formed at an outer side end portion of the wheel hub. The depth of the recess extends to at least near the bottom of the inner raceway surface of the wheel hub. A wall thickness of the wheel hub in a direction of the ball contact angle α on the inner raceway surface is set at a range of 0.2~0.3 times the diameter of the ball contact point on the inner raceway surface. The outer side wall thickness of the wheel hub is substantially constant and is set larger than two times the depth of the hardened layer.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of the vehicle wheel bearing apparatus.

FIG. 2 is an enlarged longitudinal view of only the wheel hub of FIG. 1.

FIG. 3 is a longitudinal section view of a second embodiment of the vehicle wheel bearing apparatus.

FIG. 4 is an enlarged longitudinal view of only the wheel hub of FIG. 3.

FIG. 5 is a longitudinal section view of a third embodiment of the vehicle wheel bearing apparatus.

FIG. 6 is a partially enlarged view of the wheel hub of FIG. 5.

FIG. 7 is an enlarged cross-sectional view of an assembling process of a bearing.

FIG. 8 is a longitudinal section view of a fourth embodiment of the vehicle wheel bearing apparatus.

FIG. 9 is a partially enlarged view of the wheel hub of FIG. 8.

FIG. 10 is an enlarged cross-sectional view of an assembling process of a bearing.

FIG. 11 is a longitudinal section view of a fifth embodiment of the vehicle wheel bearing apparatus.

FIG. 12 is a partially enlarged cross-sectional view of the outer side bearing row of FIG. 11.

FIG. 13 is an enlarged cross-sectional view of an assembling process of a bearing.

FIG. 14 is an enlarged cross-sectional view of grinding process of a wheel hub.

FIG. 15 is an enlarged cross-sectional view of a grinding process of an outer member.

FIG. 16 is an enlarged cross-sectional view of another grinding process of an outer member.

FIG. 17 is an enlarged cross-sectional view of an assembling process of a bearing.

FIG. 18 is a longitudinal section view of a sixth embodiment of the vehicle wheel bearing apparatus.

FIG. 19 is a longitudinal section view of a seventh embodiment of the vehicle wheel bearing apparatus.

FIG. 20 is a longitudinal section view of an eighth embodiment of the vehicle wheel bearing apparatus.

FIG. 21 is a longitudinal section view of a ninth embodiment of the vehicle wheel bearing apparatus.

FIG. 22 is a longitudinal section view of a prior art vehicle wheel bearing apparatus.

FIG. 23 is a longitudinal section view of another prior art vehicle wheel bearing apparatus.

DETAILED DESCRIPTION

Preferred embodiments of the present disclosure will be described with reference to accompanied drawings.

FIG. 1 is a longitudinal section view of a first embodiment of the vehicle wheel bearing apparatus. FIG. 2 is an enlarged longitudinal view of only the wheel hub of FIG. 1.

The wheel bearing apparatus shown in FIG. 1 is a third generation type used for a driven wheel. It includes an inner member 1, an outer member 2, and a plurality of balls 3 and tapered rollers 4 freely rollably contained between the inner and outer members 1, 2. The inner member 1 has a wheel hub 5 and an inner ring 6 press fit onto the wheel hub 5 via a predetermined interference.

The wheel hub 5 is integrally formed with a wheel mounting flange 7 at its one end. One (outer side) inner raceway surface 5a, with a circular arc cross section, is formed on the wheel hub outer circumference. A cylindrical portion 5b extends from the inner raceway surface 5a, via a shaft shaped portion 8. Hub bolts 7a are arranged on the wheel mounting flange 7 equidistantly along the periphery of the wheel mounting flange 7. Round apertures 7b are formed between the hub bolts 7a. These round apertures 7b contribute not only to the weight reduction of the bearing apparatus but to passage of any fastening tools used to assemble and disassemble the bearing apparatus.

The outer circumference of the inner ring 6 is formed with another (inner side) inner raceway surface 6a, having a tapered cross section. A larger flange 6b, to guide the tapered rollers 4, is formed on a larger diameter side of the inner raceway surface 6a. A smaller flange 6c, to prevent fall out of the tapered rollers 4 from the inner raceway surface 6a, is formed on a smaller diameter side of the inner raceway surface 6a. The inner ring 6 is press fit onto the cylindrical portion 5b of the wheel hub 5 via a predetermined interference. It is axially secured on the cylindrical portion 5b by a caulked portion 9. The caulked portion is formed by plastically deforming the end of the cylindrical portion 5b, which applies the predetermined pre-load. Accordingly, it is possible to reduce the weight and size of the bearing apparatus and to keep an initially set pre-load for a long term.

The wheel hub 5 is made of medium carbon steel including carbon of 0.40~0.80% by weight such as S53C. It is hardened by high frequency induction quenching. A region from an inner side base portion 7c (to which an outer side seal 12 contacts) of the wheel mounting flange 7 including the inner raceway surface 5a to the cylindrical portion 5b. A hardened layer 23 has a surface hardness of 58~64 HRC (shown by cross-hatch). The caulking portion 9 remains as is with its original surface hardness after forging. Accordingly, the wheel hub 5 has a sufficient mechanical strength against a rotary bending load applied to the wheel mounting flange 7. The anti-fretting strength of the cylindrical portion 5b at a region press-fit by the inner ring 6 can be improved. Also, the plastically deforming working of the caulking portion 9 can be also carried out without any micro crack. The inner ring 6, the balls 3 and the tapered rollers 4 are made of high carbon chrome steel such as SUJ2. They are hardened to their core by dip quenching to have a surface hardness of 58~64 HRC.

The outer member 2 is integrally formed with a body mounting flange 2c on its outer circumference. The body mounting flange 2c is mounted on a knuckle (not shown) of a vehicle. The outer member inner circumference has an outer side outer raceway surface 2a opposite to the inner raceway surface 5a of the wheel hub 5 and an inner side outer raceway surface 2b opposite to the inner raceway surface 6a of the inner ring 6. The outer member 2 is made of medium carbon steel including carbon of 0.40~0.80% by weight such as S53C. The double row outer raceway surfaces 2a, 2b are hardened by high frequency induction quenching to have a surface hardness of 58~64 HRC. A plurality of balls 3 and tapered rollers 4 are freely rollably contained via cages 10, 11 between the raceway surfaces 2a, 5a; 2b, 6a. Seal 12 and a magnetic encoder 13 are mounted within annular openings formed between the outer member 2 and inner member 1. The seal prevents leakage of grease contained in the bearing and rain water and dusts from entering into the bearing from the outside.

In this embodiment, a pitch circle diameter PCDi of the inner side row of tapered rollers 4 is set smaller than a pitch circle diameter PCDo of the outer side row of balls 3. This makes the inner side outer diameter DO of the outer member 2 small. Accordingly, this reduces the knuckle size without reducing the fundamental rated load of the inner side row of rolling elements. Thus, this reduces the weight and size of the wheel bearing apparatus and increases the rigidity of the inner side row of rolling elements.

In addition, the wheel hub 5 outer circumference has a shaft shaped portion 8 with a smaller diameter gradually reducing from the inner raceway surface 5a toward the inner side via a small tapered portion 14 and a stepped portion 8a. The cylindrical portion 5b, via a shoulder portion 8b, abuts against the inner ring 6. The outer diameter of the inner raceway surface 5a of the wheel hub 5 is larger than that of the inner raceway surface 6a of the inner ring 6 in accordance with difference between the pitch circle diameters PCDo, PCDi.

In the outer member 2, the outer diameter of the outer side outer raceway surface 2a is larger than the inner side outer raceway surface 2b. The outer side outer raceway surface 2a is connected to the inner side outer raceway surface 2b via a cylindrical shoulder portion 15 and a stepped portion 15a.

A substantially conical recess 17 is formed at the outer side end portion of the wheel hub 5. The recess 17 is formed by forging. Its depth extends to near the bottom of the outer side inner raceway surface 5a. Thus, the outer side wall thickness of the wheel hub 5 becomes substantially constant corresponding to the inner surface of the recess 17. Since the wheel hub 5 may be deformed, as shown by a contacting angle α of the outer side ball 3, when a moment load is applied to the wheel mounting flange 7, the applicant has found that the wall thickness of the wheel hub 5 outside the contacting angle α is very important.

As shown in an enlarged view of FIG. 2, the base portion 7c of the wheel mounting flange 7, forming the seal land portion, is formed with a circular arc cross-section. It has been found that it is possible to achieve the weight reduction while keeping the strength and rigidity of the wheel hub 5 when conditions in use correspond to setting a minimum wall thickness t1 of the base portion 7c in a range of $0.2 \leq t1/d1 \leq 0.3$. This can be obtained by a FEM analysis to determine the rigidity of the wheel hub 5 from a relationship between the minimum wall thickness t1 of the base portion 7c and a diameter d1 of the corresponding portion. It has also been found that the desired rigidity cannot be obtained when the minimum wall thickness t1 of the base portion 7c is less than 20% of the diameter d1 of the corresponding portion because this causes excessive deformation. On the other hand, an expected increase of rigidity cannot be obtained although the minimum wall thickness t1 exceeds 30% of the diameter d1 instead the weight of the wheel hub is remarkably increased.

In addition according to the present embodiment, the minimum wall thickness t1 of the base portion 7c is set to be more than 2 times the effective hardened layer depth of a hardened layer 23 in order to prevent the generation of cracks by high frequency quenching at the outer circumference of the wheel hub 5. Similarly to the base 7c of the wheel mounting flange 7, a relationship between the wall thickness t2 in a direction of the contacting angle α of the ball 3 on the inner raceway surface 5a and a diameter (ball contacting diameter) d2 of corresponding portion is set in the range $0.2 \leq t2/d2 \leq 0.3$ and at least 2 times the effective hardened layer depth in the hardened layer 23. In this embodiment, the effective hardened layer depth is set in a range 25 mm and about 3.5 mm.

In the wheel bearing apparatus having such a structure, the pitch circle diameter PCDo of the outer side balls 3 is larger than the pitch circle diameter PCDi of the inner side tapered rollers 4. Thus, the number of balls 3 is larger than the number of the tapered rollers 4. The bearing rigidity of the outer side portion is increased. Each wall thickness t1, t2 is set within a predetermined range corresponding to the recess 17 formed in the outer side end portion of the wheel hub 5. According to this embodiment, since the outline of the wheel hub 5 is set in the predetermined configuration and dimension so that the outer side of the wheel hub 5 has a substantially constant wall thickness, it is possible to provide a wheel bearing apparatus that can simultaneously solve the antinomic problems of reducing the weight and size of the wheel bearing apparatus and increasing its rigidity and strength.

FIG. 3 is a longitudinal section view of a second embodiment of the vehicle wheel bearing apparatus. FIG. 4 is an enlarged longitudinal view of only the wheel hub of FIG. 3. Since this embodiment is only fundamentally different from the first embodiment in the structure of the wheel hub, the same reference numerals as those used in the first embodiment are also used in this embodiment to designate the same components.

The wheel bearing apparatus of this embodiment is a third generation type used for a driven wheel. It comprises an inner member 18, the outer member 2, and a plurality of balls 3 and tapered rollers 4 freely rollably contained between the inner and outer members 18, 2. The inner member 18 includes a wheel hub 19 and inner ring 6 press fit onto the wheel hub 19 via a predetermined interference.

The wheel hub 19 is made of medium carbon steel including carbon of 0.40~0.80% by weight such as S53C. It is formed on its outer side end with a recess 20 having a depth larger than that of the previously described recess 17 (shown in FIG. 3 by a two-dotted line). The depth of the recess 20 extends to near a stepped portion 22 beyond the bottom of the outer side inner raceway surface 5a and a shaft shaped portion 21. The outer side outline of the wheel hub 19 is determined so that the wall thickness of the wheel hub 19 becomes substantially constant corresponding to the inner surface of the recess 20. A predetermined hardened layer (shown by cross-hatch) 24 is formed on the outer circumference of the wheel hub 19. That is, according to this embodiment shown in an enlarged view of FIG. 4, the minimum wall thickness t1 of the base portion 7c and the wall thickness t2 in the direction of contacting angle α in the inner raceway surface 5a are set so that they are larger than the minimum wall thickness (thickness at the bottom diameter d0 of the inner raceway surface 5a) t0. The minimum wall thickness t1 of the base 7c (forming the seal land portion) of the wheel mounting flange 7 and the wall thickness t2 in the direction of the contacting angle α are included within 0.2~0.3 of each diameter d1, d2 at corresponding position. The wall thickness t3 of the bottom of the recess 20 is substantially same as the wall thickness t1, t2 at positions other than the contacting angle α. Each wall thickness t1, t2, t3 is set larger than two times the effective hardened layer depth of the hardened layer 24. This makes it possible to prevent the generation of cracks during the high frequency induction quenching. Also, it achieves further weight reduction of the bearing apparatus while keeping the rigidity of the wheel hub 19.

FIG. 5 is a longitudinal section view of a third embodiment of the vehicle wheel bearing apparatus. FIG. 6 is a partially enlarged view of the wheel hub of FIG. 5. FIG. 7 is an enlarged view showing an assembling process of a bearing. Since this embodiment is only fundamentally different from the first embodiment (FIG. 1) in structure of the wheel hub, the same reference numerals as those used in the first embodiment are also used in this embodiment to designate the same components.

The wheel bearing apparatus of this embodiment is a third generation type used for a driven wheel. It comprises an inner member 25, the outer member 2, and a plurality of balls 3 and tapered rollers 4 freely rollably contained between the inner and outer members 25, 2. The inner member 25 includes a wheel hub 26 and inner ring 6 press fit onto the wheel hub 26 via a predetermined interference.

The wheel hub 26 is integrally formed with a wheel mounting flange 7 at one end. One (outer side) inner raceway surface 5a, having a circular arc cross section, is formed on its outer circumference. A cylindrical portion 5b extends from the inner raceway surface 5a, via a shaft shaped portion 8. The wheel hub 26 is made of medium carbon steel including carbon of 0.40~0.80% by weight such as S53C. It is hardened by high frequency induction quenching so that a region from an inner side base portion 7c of the wheel mounting flange 7 (to which an outer side seal 12 contacts) including the inner raceway surface 5a to the cylindrical portion 5b has a surface hardness of 58~64 HRC.

In this embodiment, each corner portion on the outer circumference of the wheel hub 26 is rounded to have a smooth circular arc. That is, a corner A between the base portion 7c and a shoulder portion of the inner raceway surface 5a, and a corner B of the stepped portion 8a are formed to have a predetermined chamfered configuration and dimension to have a corner radius R. More particularly as shown in the enlarged view of FIG. 6, the corner A is formed so that it has the axial chamfer dimension La of 0.15~0.8 mm, preferably 0.15~0.3 mm. The radial dimension Lr is 0.15~0.8 mm, preferably 0.15~0.3 mm. The corner radius R is 0.15~2.0 mm, preferably 0.45~0.7 mm in order to have smooth transition portions. When the corner radius R is less than 0.15 mm, the balls 3 tend to be scratched. When the corner radius R exceeds 2.0 mm, the oval contact region of the balls 3 tend to ride over the inner raceway surface 5a and come out from the inner raceway surface 5a. Similarly, the corner B is formed so that it has an axial chamfer dimension La and a radial dimension Lr of 0.5~5 mm. The corner radius R is 1.0~10 mm and thus has a smooth transition portion.

In addition, a counter portion C is formed near the bottom of the inner raceway surface 5a. It has a predetermined width and a diameter larger than that of the bottom of the inner raceway surface 5a. A smaller diameter portion 14 is formed either by a tapered surface reducing its diameter from the counter portion C toward the inner side or by a circular arc surface having a predetermined radius of curvature. A stepped portion 8a is formed from the smaller diameter portion 14 via the corner B. The counter portion C is also formed as a smooth circular arc having a corner radius R of 1.0~5 mm Since the corner portions A, B, C on the outer circumference of the wheel hub 26 are rounded, it is possible to suppress the generation of damages to the balls 3 during the assembling of the bearing apparatus as shown in FIG. 7 even though the outer side balls 3 would contact the corners A, B, C of the wheel hub 26. Thus, this improves the noise characteristics and the life of the bearing apparatus.

In addition since the corner A between the base portion 7c of the wheel mounting flange 7 and the outer side inner raceway surface 5a is smoothly rounded, it is possible to prevent the lip of seal 12 from being damaged even though the lip contacts the corner A. It is also possible to suppress the generation of "edge load" even though the oval contacting region where the balls 3 contact the inner raceway surface rides over the corner A when a large bending moment is applied to the wheel bearing apparatus. Thus, this improves the life of the bearing apparatus.

FIG. 8 is a longitudinal section view of a fourth embodiment of the vehicle wheel bearing apparatus. FIG. 9 is a partially enlarged view of the wheel hub of FIG. 8. FIG. 10 is an enlarged view showing an assembling process of a bearing. Since this embodiment is only fundamentally different from the second embodiment (FIG. 3) in the structure of the wheel hub, the same reference numerals as those used in the second embodiment are also used in this embodiment to designate the same components.

The wheel bearing apparatus of this embodiment is a third generation type used for a driven wheel. It comprises an inner member 27, the outer member 2, and a plurality of balls 3 and tapered rollers 4 freely rollably contained between the inner and outer members 27, 2. The inner member 27 includes a wheel hub 28 and inner ring 6 press fit onto the wheel hub 28 via a predetermined interference.

In this embodiment, each corner portion on the outer circumference of the wheel hub 28 is rounded to have a smooth circular arc. That is, a corner A between the base portion 7c and the inner raceway surface 5a, a corner D between a shaft shaped portion 21 and a tapered step portion 22, and a corner E between the tapered step portion 22 and the shoulder portion 8b are formed with a predetermined chamfered configuration and dimension having a corner radius R. More particularly, as shown in the enlarged view of FIG. 9, the corner A is formed so that it has an axial chamfer dimension La of 0.15~0.8 mm, preferably 0.15~0.3 mm. The radial dimension Lr is 0.15~0.8 mm, preferably 0.15~0.3 mm. The corner radius R is 0.15~2.0 mm, preferably 0.45~0.7 mm in order to have smooth transition portions. The corners D, E are formed so that they have the axial chamfer dimension La and the radial dimension Lr of 0.5~5 mm. The corner radius R is 1.0~10 mm and thus it has smooth transition portions.

Since the corner portions A, C, D, E on the outer circumference of the wheel hub 28 are rounded, it is possible to suppress the generation of damages on the balls 3 during assembling steps of the bearing apparatus as shown in FIG. 10 even though the outer side balls 3 would contact the corners A, C, D, E of the wheel hub 28. Thus, this improves the noise characteristics and the life of the bearing apparatus.

FIG. 11 is a longitudinal section view of a fifth embodiment of the vehicle wheel bearing apparatus. FIG. 12 is a partially enlarged view of an outer side bearing row of FIG. 11. FIG. 13 is an enlarged view of an assembling process of a bearing. FIG. 14 is an enlarged view of a grinding process of a wheel hub. FIG. 15 is an enlarged view showing a grinding process of an outer member. FIG. 16 is an enlarged view showing another grinding process of an outer member. FIG. 17 is an enlarged view of an assembling process of a bearing. Since this embodiment is only partially different from the fourth embodiment (FIG. 8) in structures of the outer member, the same reference numerals as those used in the fourth embodiment are also used in this embodiment to designate the same components.

The wheel bearing apparatus of this embodiment is a third generation type used for a driven wheel. It comprises the inner member 27, an outer member 29, and a plurality of balls 3 and tapered rollers 4 freely rollably contained between the inner and outer members 27, 29.

In this embodiment counter portions C, F of each raceway surfaces 5a, 2a of the outer side row of balls 3 and the corners A, G of the shoulders of the raceway surfaces 5a, 2a are rounded to have smooth circular arcs. More particularly as shown in an enlarged view of FIG. 12, the counter portion C is formed to have a predetermined width larger than the bottom diameter of the inner raceway surface 5a near the bottom of the inner raceway surface 5a. The counter portion C is formed as a smooth circular arc with the corner radius ~5 mm. The counter portion F and the corners A, G of the shoulders of the raceway surface are formed so that they have the axial chamfer dimension La of 0.15~0.8 mm, preferably 0.15~0.3 mm. The radial dimension Lr is 0.15~0.8 mm, preferably 0.15~0.3 mm. The corner radius R is 0.15~2.0 mm, preferably 0.45~0.7 mm in order to have smooth transition portions. When the corner radius R is less than 0.15 mm, the balls 3 tend to be scratched. When the corner radius R exceeds 2.0 mm, the oval contact region of the balls 3 tend to ride over the corner portions A, G of the shoulders of the raceway surfaces and come out from the inner raceway surface 5a and the outer raceway surface 2a.

Since the counter portions C, F of each raceway surfaces 5a, 2a of the outer side row of the balls 3 and the corners A, G of the shoulders of the raceway surfaces 5a, 2a are rounded to have smooth circular arcs, it is possible to suppress the generation of damages on the balls 3 during assembling steps of the bearing apparatus as shown in FIG. 13. This improves the noise characteristics even though the outer side balls 3 would contact the counter portions C, F of each raceway surfaces 5a, 2a of the outer side row of balls 3 and the corners A, G of the shoulders of the raceway surfaces 5a, 2a. In addition, it is possible to prevent the lip of seal 12 from being damaged even though the lip contacts the corner A during mounting of the seal 12. Thus, this improves reliability and sealability of the seal 12. It is also possible to suppress the generation of "edge load" even though the oval contacting region where the balls 3 contact the inner raceway surfaces 5a, 2a rides over the corners A, G when a large bending moment is applied to the wheel bearing apparatus. Thus, this improves the life of the bearing apparatus.

As shown in FIGS. 14 and 15, the counter portions C, F and corner portions A, G of the shoulders of the raceway surfaces are ground, by formed grinding wheels, simultaneously with each raceway surface 5a, 2a, after heat treatment. That is, as shown in FIG. 14, the base portion 7c forming the seal land portion of the wheel mounting flange 7 and the inner raceway surface 5a are ground together by the formed grinding wheel 30. The corner A of the shoulder of the raceway surface and the corner portion C are also simultaneously ground by the formed grinding wheel 30. Since the counter portion C is ground simultaneously with the inner raceway surface 5a, it is possible to prevent the generation of burrs and to accurately form the outer diameter of the counter portion C without dispersion. In addition, as shown in FIG. 15, the double row outer raceway surfaces 2a, 2b of the outer member 29 are simultaneously ground by a formed grinding wheel 31. The counter portion F and the corner portion G of the shoulder of raceway surface are ground, by the formed grinding wheel 31, simultaneously with the outer raceway surfaces 2a, 2b. Accordingly, smooth surfaces can be formed with high accuracy.

In addition, as shown in FIG. 16, it is possible to simultaneously grind an inner diameter 32 of the counter of the outer member 29 and a seal fitting surface 33 where the seal 12 is mounted. In this case the surface roughness is limited to 3.2 Ra or less. "Ra" is one of a roughness form parameters of JIS (JIS B 0601-1994) and means the arithmetical mean of roughness, a mean value of the absolute value deviation from the mean line. By limiting the surface roughness of the inner diameter 32 of counter, it is possible to prevent transcription or generation of scratch damages on the surfaces of the balls 3 even though the balls 3 are inserted into the raceway surface contacting with the inner diameter 32 of the counter. It is possible to suppress generation of gouge even though the balls 3 contact the corner portion of the counter portion F.

Although it is illustrated that the inner diameter 32 of counter is ground, by the formed grinding wheel 34, simultaneously with the outer raceway surface 2a, the present disclosure is not limited to the illustrated example. Thus, it is possible to previously carry out turning of parts. In such a case since the balls 3 would be damaged by transcription of the turning traces if the traces are leading traces or crossing traces, it is preferable to carry out the turning by a plunge cutting process instead of a traverse process. Table 1 (below) shows a relationship between the feeding speed of bite and the surface roughness of the inner diameter 32 of the counter and damage depth on the balls 3. It is appreciated from Table 1 that it is possible to improve the surface roughness of the inner diameter 32 of the counter to 3.3 Ra or less and to prevent the generation of damages on the balls 3 by carrying out the turning at a low feeding speed of bite less than 0.2 mm/rev. although it is the traverse process. Accordingly, it will be appreciated that it is possible to prevent the generation of scratches or gauges on the balls during assembly of the wheel bearing apparatus. Thus, this improves the noise characteristics of bearing apparatus if the inner diameter 32 of the counter is limited to a predetermined surface roughness.

TABLE 1

| Feeding speed mm/rev. | Surface roughness of counter inner diameter Ra | Depth of ball damages µm |
| --- | --- | --- |
| 0.3 | 5.8 | 0.6 |
| 0.2 | 3.3 | None |
| 0.1 | 1.6 | None |
| 0.05 | 0.7 | None |

FIG. 18 is a longitudinal section view of a sixth embodiment of the vehicle wheel bearing apparatus. The same reference numerals as those used in the previous embodiments are also used in this embodiment to designate the same components.

The wheel bearing apparatus of this embodiment is a second generation type used for a driven wheel. It comprises a wheel hub 35, and a wheel bearing 36 secured on the wheel hub 35. The wheel hub 35 is integrally formed with a wheel mounting flange on its outer side end. A cylindrical portion 35b axially extends from the wheel mounting flange, via a shoulder 35a.

The wheel bearing 36 is press-fit onto the cylindrical portion 35b. It abuts against the shoulder 35a of the wheel hub 35 and is axially secured by a caulked portion 9. The caulked portion 9 is formed by plastically deforming the end of the cylindrical portion 35b. The wheel hub 35 is made of medium carbon steel including carbon of 0.40~0.80% by weight such as S53C. It is hardened by high frequency induction quenching so that a region from the shoulder portion 35a to the cylindrical portion 35b has a surface hardness of 58~64 HRC. Accordingly, the wheel hub 35 has a sufficient mechanical strength against rotary bending loads applied to the wheel mounting flange 7. Additionally, the anti-fretting strength of the cylindrical portion 35b at the press-fit region of the wheel bearing 36 can be improved.

The wheel bearing 36 includes an outer member 37 integrally formed with a body mounting flange 2c on its outer circumference. Its inner circumference has double row outer raceway surfaces 37a, 37b. Two inner rings 38, 39 are each formed, on their outer circumference, with inner raceway surfaces 38a, 39a, respectively, opposite to the outer raceway surfaces 37a, 37b. A plurality of balls 3 and tapered rollers 4 are freely rollably contained between the outer and inner raceway surfaces 37a, 37b and 38a, 39a via cages 10, 40. Seals 41, 42 are mounted within annular openings formed between the outer member 37 and inner rings 38, 39. The seals prevent leakage of grease contained in the bearing and rain water and dusts from entering into the bearing from the outside.

The outer side raceway surfaces 37a, 38a are formed so that each has a circular arc configuration where the balls 3 angular contact. The inner side raceway surfaces 37b, 39a are formed so that each has a tapered configuration where the tapered rollers 4 line contact.

The outer member 37 is made of medium carbon steel including carbon of 0.40~0.80% by weight such as S53C. The double row outer raceway surfaces 37a, 37b are hardened by high frequency induction quenching to have a surface hardness of 58~64 HRC. The inner rings 38, 39 are made of high carbon chrome steel such as SUJ2. They are hardened to their core by dip quenching to have a surface hardness of 58~64 HRC.

In this embodiment, a pitch circle diameter PCD of the outer side row of balls 3 and a pitch circle diameter PCD of the inner side row of tapered rollers 4 are set the same to each other. The inner side row of balls 3 is arranged equidistantly at a slight space in the circumferential direction. Thus, the number of the inner side row of balls 3 is set larger than the number of the outer side row of tapered rollers 4. Accordingly, the whole rigidity of the rolling bearing can be increased and the fundamental rated load of the inner side row of rolling elements can be larger than that of the outer side row of rolling elements. Thus, it is possible to keep the life of the bearing apparatus even though a load applied to the inner side row of rolling elements exceeds loads applied to the outer side row of rolling elements. Thus, it is possible to realize a useful design of the wheel bearing apparatus and to provide a wheel bearing apparatus with improved strength and durability.

FIG. 19 is a longitudinal section view of a seventh embodiment of the vehicle wheel bearing apparatus. Since this embodiment is only fundamentally different from the sixth embodiment (FIG. 18) in the structure of the wheel hub, the same reference numerals as those used in the previous embodiments are also used in this embodiment to designate the same components.

The wheel bearing apparatus of this embodiment is a third generation type for a driven wheel. It comprises the outer member 37, and an inner member 44 including a wheel hub 43 and inner ring 39 press-fit onto a cylindrical portion 43a of the wheel hub 43. The wheel hub 43 is formed on its outer circumference with an outer side inner raceway surface 5a arranged opposite to the outer side outer raceway surface 37a. The cylindrical portion 43a axially extends from the inner raceway surface 5a. The inner ring 39 is press-fit onto the cylindrical portion 43a, via a predetermined interference, and axially secured to it by the caulked portion 9.

Seals 45, 42 are mounted within annular openings formed between the outer member 37 and the wheel hub 43 and inner ring 39 to prevent the leakage of grease contained in the bearing and rain water and dusts from entering into the bearing from the outside. The wheel hub 43 is made of medium carbon steel including carbon of 0.40~0.80% by weight such as S53C. It is hardened by high frequency induction quenching so that a region including a seal land portion, where the seal 45 sliding contacts, the inner raceway surface 5a and the cylindrical portion 43a has surface hardness of 58~64 HRC.

Similarly to the sixth embodiment, also in this embodiment, a pitch circle diameter PCD of the outer side row of balls 3 and a pitch circle diameter PCD of the inner side row of tapered rollers 4 are set the same as each other. The number of the outer side row of balls 3 is set larger than the number of the inner side row of tapered rollers 4. Accordingly, it is possible to increase whole rigidity of the wheel bearing apparatus while reducing its weight and size and the fundamental rated load of inner side row of rolling elements becomes larger than that of the fundamental rated load of outer side row of rolling elements. Thus, it is possible to maintain the life of the bearing apparatus even though a load applied to the inner side row of rolling elements exceeds a load applied to the outer side row of rolling elements.

FIG. 20 is a longitudinal section view of an eighth embodiment of the vehicle wheel bearing apparatus. Since this embodiment is only fundamentally different from the sixth embodiment (FIG. 18) in the pitch circle diameters of both rows of rolling elements, the same reference numerals as those used in the sixth embodiment are also used in this embodiment.

The wheel bearing apparatus of this embodiment is a second generation type for a driven wheel. It comprises a wheel hub 46 and a wheel bearing 47 secured on the wheel hub 46. The wheel hub 46 is integrally formed with the wheel mounting flange 7 at its outer side end. A cylindrical portion 46b axially extends from the wheel mounting flange 7, via a shoulder portion 46a. The wheel bearing 47 is press-fit onto the cylindrical portion 46b, via a predetermined interference. The wheel bearing 47 abuts against the shoulder 46a of the wheel hub 46. It is axially secured by the caulked portion 9 that is formed by plastically deforming the end of the cylindrical portion 46b.

The wheel bearing 47 comprises an outer member 48 formed with a body mounting flange 2c on its outer circumference. Its inner circumference has double row outer raceway surfaces 37a, 48a. Two inner rings 49, 6, on its outer circumference, have inner raceway surfaces 5a, 6a arranged opposite to the double row outer raceway surfaces 37a, 48a. A plurality of balls 3 and tapered rollers 4 are freely rollably contained between the outer and inner raceway surfaces 37a, 48a; 5a, 6a via cages 10, 11. Seals 41, 50 are mounted within annular openings formed between the outer member 48 and the two inner rings 49, 6. The seals 41, 50 prevent leakage of grease contained in the bearing and rain water and dusts from entering into the bearing from the outside.

The outer member 48 is made of medium carbon steel including carbon of 0.40~0.80% by weight such as S53C. The double row outer raceway surfaces 37a, 48a are hardened by high frequency induction quenching to have a surface hardness of 58~64 HRC. In addition the inner ring 49 is made of high carbon chrome bearing steel such as SUJ 2. They hardened to their cores by dip quenching to have a hardness of 58~64 HRC.

In this embodiment, a pitch circle diameter PCDi of the inner side row of tapered rollers 4 is set smaller than a pitch circle diameter PCDo of the outer side row of balls 3. According to the difference in the pitch circle diameters PCDi and PCDo, it is possible to set so the number of the outer side row of balls 3 larger than the number of the inner side row of tapered rollers 4. This reduces the inner side outer diameter D0 of the outer member 48. This reduces the knuckle size without reducing the fundamental rated load of the inner side bearing row. Thus, this reduces the weight and size of the wheel bearing apparatus. In addition, it is possible to make the cylindrical portion 46b as a straight cylinder. Thus, this improves the workability of the wheel hub 46 even though there is a difference in the pitch circle diameters PCDo and PCDi by making the thickness of the outer side inner ring 49 larger corresponding to the enlargement of the pitch circle diameter PCDo of the outer side row of balls 3.

FIG. 21 is a longitudinal section view of a ninth embodiment of the vehicle wheel bearing apparatus. Since this embodiment is only fundamentally different from the eighth embodiment (FIG. 20) in the structure of the wheel hub, the same reference numerals as those used in the eighth embodiment are also used in this embodiment.

The wheel bearing apparatus of this embodiment is a third generation type for a driven wheel. It comprises an outer member 48, and an inner member 52 including a wheel hub 51 and an inner ring 6 press-fit onto a cylindrical portion 51a of the wheel hub 51. The wheel hub 51 is formed, on its outer circumference, with an outer side inner raceway surface 5a arranged opposite to the outer side outer raceway surface 37a. The cylindrical portion 51a axially extends from the inner raceway surface 5a. The inner ring 6 is press-fit onto the cylindrical portion 51a via a predetermined interference and axially secured by the caulked portion 9.

The wheel hub 51 is made of medium carbon steel including carbon of 0.40~0.80% by weight such as S53C. It is hardened by high frequency induction quenching so that a region including a seal land portion, where the seal 45 sliding contacts, the inner raceway surface 5a and the cylindrical portion 51a has a surface hardness of 58~64 HRC.

Similarly to the previous embodiments, in this embodiment, a pitch circle diameter PCDi of the inner side row of tapered rollers 4 is set smaller than a pitch circle diameter PCDo of the outer side row of balls 3. The number of the outer side row of balls 3 is set larger than the number of the inner side row of tapered rollers 4. This makes the inner side outer diameter D0 of the outer member 48 smaller and accordingly reduces the knuckle size without reducing the fundamental rated load of the inner side bearing row. Accordingly, it is possible to reduce the weight and size of the wheel bearing apparatus to increase the whole bearing rigidity and to maintain the life of the bearing apparatus even though a load applied to the inner side row of rolling elements exceeds a load applied to the outer side row of rolling elements.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The wheel bearing apparatus can be applied to the wheel bearing apparatus of a second or third generation type used for a driven wheel.

What is claimed is:

1. A vehicle wheel bearing apparatus comprising:

an outer member formed with a body mounting flange on its outer circumference and with a double row outer raceway surface on its inner circumference;

an inner member including a wheel hub and an inner ring, the wheel hub having an integrally formed wheel mounting flange at one end and on the inner member outer circumference it has a base portion forming a seal land portion and an adjacent one inner raceway surface arranged opposite to one of the double row outer raceway surfaces, a cylindrical portion axially extends from the inner raceway surface, the inner ring fits onto the cylindrical portion of the wheel hub via a predetermined interference, and said inner ring outer circumference includes the other inner raceway surface arranged opposite to the other of the double row outer raceway surfaces and a substantially conical recess is formed at an outer side end portion of the wheel hub depth of the recess extends to at least near the bottom of the inner raceway surface of the wheel hub;

double row rolling elements are freely rollably contained between the outer and inner raceway surfaces, respectively, of the outer member and the inner member;

outer side rolling elements of the double row rolling elements are balls and inner side rolling elements of the double row rolling elements are tapered rollers;

a pitch circle diameter of the inner side tapered rollers is set smaller than that of the outer side balls; and a portion of the wheel hub defined on one side from said base portion to and including the one inner raceway surface and on the other side by a wall on an inner surface defined by said conical recess, said portion of the wheel hub has a thickness between said one side and the other side, said thickness being substantially constant along the portion of the wheel hub that is defined on the one side from said base portion through said inner raceway surface and on the other side by the wall on the inner surface of the conical recess.

2. The vehicle wheel bearing apparatus of claim 1 wherein a predetermined hardened layer is continuously formed by high frequency induction quenching in a region from the inner side base of the wheel mounting flange of the wheel hub to the cylindrical portion, including the inner raceway surface of the wheel hub, and the outer side wall thickness of the wheel hub is set larger than two times the depth of said hardened layer.

3. The vehicle wheel bearing apparatus of claim 1 wherein a wall thickness of the wheel hub in a direction of the ball contact angle α on the inner raceway surface is set in a range of 0.2~0.3 times the diameter of the ball contact point on the inner raceway surface.

4. The vehicle wheel bearing apparatus of claim 1 wherein a shaft shaped portion is formed so that it extends from the bottom of the inner raceway surface of the wheel hub to the cylindrical portion, a tapered step portion is formed between the shaft shaped portion and a shoulder portion, which abuts the inner ring, wherein the depth of the recess extends to near the step portion beyond the bottom of the inner raceway surface, and the wall thickness of the wheel hub in a direction of the ball contact angle α on the inner raceway surface is set thicker than the wall thickness at the bottom of the inner raceway surface of the wheel hub.

5. The vehicle wheel bearing apparatus of claim 1 wherein the inner ring is axially secured on the wheel hub with a predetermined pre-load applied by a caulked portion that is formed by plastically deforming radially outward the end of the cylindrical portion of the wheel hub.

6. The vehicle wheel bearing apparatus of claim 1 wherein each corner portion on the outer circumference of the wheel hub is rounded to have a smooth circular arc configuration.

7. The vehicle wheel bearing apparatus of claim 6 wherein shoulder portion and counter portions of the outer side inner raceway surface are ground, by a formed grinding wheel, simultaneously with the inner raceway surface after heat treatment.

8. The vehicle wheel bearing apparatus of claim 1 wherein at least a corner portion of a counter portion of each raceway surface in the outer side bearing row is rounded to have a smooth circular arc configuration.

9. The vehicle wheel bearing apparatus of claim 8 wherein a corner portion of the shoulder portion of each raceway surface in the outer side bearing row is rounded to have a smooth circular arc configuration.

10. The vehicle wheel bearing apparatus of claim 8 wherein the counter portion and shoulder portion of the raceway surface of the outer side bearing row are ground, by a formed grinding wheel, simultaneously with the corresponding raceway surface, after heat treatment.

11. The vehicle wheel bearing apparatus of claim 8 wherein the surface roughness of inner circumferential surface of the counter portion of the outer member is limited less than 3.2 Ra.

12. The vehicle wheel bearing apparatus of claim 11 wherein the counter portion, shoulder portion and the inner circumferential surface of each raceway surface of the outer side bearing row are ground, by a formed grinding wheel, simultaneously with the corresponding raceway surface, after heat treatment.

* * * * *

UNITED STATES PATENT AND TRADEMARK OFFICE
CERTIFICATE OF CORRECTION

| | | |
|---|---|---|
| PATENT NO. | : 7,748,909 B2 | |
| APPLICATION NO. | : 12/257412 | |
| DATED | : July 6, 2010 | |
| INVENTOR(S) | : Kazuo Komori et al. | |

It is certified that error appears in the above-identified patent and that said Letters Patent is hereby corrected as shown below:

Col. 11, line 13, "25 mm" should be --2~5 mm--.

Signed and Sealed this
Fourth Day of January, 2011

David J. Kappos
*Director of the United States Patent and Trademark Office*